US008299740B2

(12) United States Patent
Fukao

(10) Patent No.: US 8,299,740 B2
(45) Date of Patent: Oct. 30, 2012

(54) MOTOR DRIVE APPARATUS

(75) Inventor: Teruo Fukao, Inuyama (JP)

(73) Assignee: Omron Automotive Electronics Co., Ltd., Achi (JP)

( * ) Notice: Subject to any disclaimer, the term of this patent is extended or adjusted under 35 U.S.C. 154(b) by 336 days.

(21) Appl. No.: 12/713,728

(22) Filed: Feb. 26, 2010

(65) Prior Publication Data

US 2010/0308763 A1 Dec. 9, 2010

(30) Foreign Application Priority Data

Jun. 4, 2009 (JP) ................................ 2009-134738

(51) Int. Cl.
*H02P 8/36* (2006.01)
*B60J 1/17* (2006.01)

(52) U.S. Cl. ......................... 318/483; 318/286; 318/468

(58) Field of Classification Search .......... 318/264–266, 318/272, 275, 280, 282, 286, 466–469, 483
See application file for complete search history.

(56) References Cited

U.S. PATENT DOCUMENTS 6,396,227 B2 * 5/2002 Sasaki .......................... 318/283
6,486,630 B2 * 11/2002 Takagi .......................... 318/445
6,690,096 B2 * 2/2004 Sasaki .......................... 307/10.1
6,690,131 B1 * 2/2004 Shimomura et al. .......... 318/445
6,975,084 B2 * 12/2005 Sugiura et al. ................ 318/283

FOREIGN PATENT DOCUMENTS

JP 2000-120330 A 4/2000
JP 2005-065442 A 3/2005

* cited by examiner

*Primary Examiner* — Bentsu Ro
(74) *Attorney, Agent, or Firm* — Osha Liang LLP

(57) ABSTRACT

A motor drive apparatus for driving a motor in a normal rotation direction or a reverse rotation direction in accordance with a state of operation of an operation switch has a first semiconductor switching device that switches ON/OFF state based on a normal rotation instruction provided by the operation switch, a second semiconductor switching device that switches ON/OFF state based on a reverse rotation instruction provided by the operation switch, a control circuit for controlling drive of the motor in the normal rotation direction or the reverse rotation direction, based on the ON/OFF state of the first and second semiconductor switching devices, and a wetting detection circuit for detecting wetting and controlling operation of the first and second semiconductor switching devices. The control circuit has a first terminal connected to the first semiconductor switching device, a second terminal connected to the second semiconductor switching device, a low level terminal for receiving and outputting a signal having a voltage value lower than a reference voltage value defined in advance, and a high level terminal for receiving and outputting a signal having a voltage value higher than the reference voltage value. When the wetting detection circuit detects wetting, voltage values of the first terminal and the second terminal are less than the reference voltage value. The first terminal and the second terminal are separated from the high level terminal, and are arranged in proximity to the low level terminal.

11 Claims, 30 Drawing Sheets

| | INPUT A | INPUT B | WINDOW OPERATION |
|---|---|---|---|
| (1) | H | H | NIL |
| (2) | L | H | UP |
| (3) | H | L | DOWN |
| (4) | L | L | NIL |

| | INPUT A | INPUT B | WINDOW OPERATION |
|---|---|---|---|
| (1) | H | H | NIL |
| (2) | L | H | UP |
| (3) | H | L | DOWN |
| (4) | L | L | NIL |

| | INPUT A | INPUT B | WINDOW OPERATION |
|---|---|---|---|
| (1) | H | H | NIL |
| (2) | L | H | UP |
| (3) | H | L | DOWN |
| (4) | L | L | NIL |

| | INPUT A | INPUT B | WINDOW OPERATION |
|---|---|---|---|
| (1) | H | H | NIL |
| (2) | L | H | UP |
| (3) | H | L | DOWN |
| (4) | L | L | NIL |

| | INPUT A | INPUT B | WINDOW OPERATION |
|---|---|---|---|
| (1) | H | H | NIL |
| (2) | L | H | UP |
| (3) | H | L | DOWN |
| (4) | L | L | NIL |

| | INPUT A | INPUT B | WINDOW OPERATION |
|---|---|---|---|
| (1) | H | H | NIL |
| (2) | L | H | UP |
| (3) | H | L | DOWN |
| (4) | L | L | NIL |

| | INPUT A | INPUT B | WINDOW OPERATION |
|---|---|---|---|
| (1) | H | H | NIL |
| (2) | L | H | UP |
| (3) | H | L | DOWN |
| (4) | L | L | NIL |

| | INPUT A | INPUT B | WINDOW OPERATION |
|---|---|---|---|
| (1) | H | H | NIL |
| (2) | H | L | DOWN |
| (3) | L | H | UP |
| (4) | L | L | NIL |

| | INPUT A | INPUT B | WINDOW OPERATION |
|---|---|---|---|
| (1) | H | H | NIL |
| (2) | H | L | DOWN |
| (3) | L | H | UP |
| (4) | L | L | NIL |

| | INPUT A | INPUT B | WINDOW OPERATION |
|---|---|---|---|
| (1) | H | H | NIL |
| (2) | H | L | DOWN |
| (3) | L | H | UP |
| (4) | L | L | NIL |

| | INPUT A | INPUT B | WINDOW OPERATION |
|---|---|---|---|
| (1) | H | H | NIL |
| (2) | H | L | DOWN |
| (3) | L | H | UP |
| (4) | L | L | NIL |

| | INPUT A | INPUT B | WINDOW OPERATION |
|---|---|---|---|
| (1) | H | H | NIL |
| (2) | H | L | DOWN |
| (3) | L | H | UP |
| (4) | L | L | NIL |

| | INPUT A | INPUT B | WINDOW OPERATION |
|---|---|---|---|
| (1) | H | H | NIL |
| (2) | H | L | DOWN |
| (3) | L | H | UP |
| (4) | L | L | NIL |

| | INPUT A | INPUT B | WINDOW OPERATION |
|---|---|---|---|
| (1) | H | H | NIL |
| (2) | H | L | UP |
| (3) | L | H | DOWN |
| (4) | L | L | NIL |

| | INPUT A | INPUT B | WINDOW OPERATION |
|---|---|---|---|
| (1) | H | H | NIL |
| (2) | L | H | DOWN |
| (3) | H | L | UP |
| (4) | L | L | NIL |

| | INPUT A | INPUT B | WINDOW OPERATION |
|---|---|---|---|
| (1) | H | H | NIL |
| (2) | L | H | DOWN |
| (3) | H | L | UP |
| (4) | L | L | NIL |

| | INPUT A | INPUT B | WINDOW OPERATION |
|---|---|---|---|
| (1) | H | H | NIL |
| (2) | L | H | DOWN |
| (3) | H | L | UP |
| (4) | L | L | NIL |

MOTOR DRIVE APPARATUS

BACKGROUND OF THE INVENTION

1. Technical Field

The present invention relates to a motor drive apparatus for driving, for example, a motor for opening and closing a window of a vehicle.

2. Related Art

FIG. 28 is a block diagram showing a power window apparatus for performing open/close control of a window of a vehicle. An operation switch 40 is a switch for opening and closing a window 50. A motor drive apparatus 41 drives a motor 58 based on operation performed on the operation switch 40, and controls, e.g., the rotational direction and the rotational speed of the motor 58. When the motor 58 rotates, a window open/close mechanism (which will be described later) that works together with the motor is activated to open or close the window 50. A rotary encoder 59 outputs a pulse in synchronization with the rotation of the motor 58. The motor drive apparatus 41 calculates, e.g., the rotational speed of the motor 58 from this pulse to control the rotation of the motor 58.

FIG. 29 is a schematic configuration view showing an example of operation switch 40. The operation switch 40 includes an operation knob 71 that can pivot about an axis Q in the ab-direction, a rod 72 arranged integrally with this operation knob 71, and a switch mechanism 73 having a contact (omitted from the figure). Numeral 74 denotes an actuator of the switch mechanism 73, and numeral 70 denotes a cover for a switch unit accommodating the operation switch 40. The lower end of the rod 72 is engaged with the actuator 74. When the operation knob 71 rotates in the ab-direction, the actuator 74 moves in the cd-direction via the rod 72, and according to the moved position, the contact of the switch mechanism 73 is switched.

The operation knob 71 is switchable to each of positions of automatic close AC, manual close MC, neutral N, manual open MO, and automatic open AO. In FIG. 29, the operation knob 71 is at the position of the neutral N. When the operation knob 71 is rotated a certain amount in the a-direction from the position of the neutral N to be brought to position of the manual close MC, a manual close operation in which the window is closed in a manual mode is performed. When the operation knob 71 is further rotated in the a-direction from the position of the manual close MC to be brought to the position of the automatic close AC, an automatic close operation in which the window is closed in an automatic mode is performed. On the other hand, when the operation knob 71 is rotated a certain amount in the b-direction from the position of the neural N to be brought to the position of the manual open MO, a manual open operation in which the window is opened in the manual mode is performed. When the operation knob 71 is further rotated in the b-direction from the position of the manual open MO to be brought to the position of the automatic open AO, an automatic open operation the window is opened in the automatic mode is performed. The operation knob 71 is arranged with a spring (not shown). With the force of the spring, the operation knob 71 returns back to the position of the neutral N when a hand is released from the rotated operation knob 71.

In the manual mode, the close operation or open operation of the window is performed only while the operation knob 71 is held by the hand at the position of the manual close MC or the manual open MC. The close operation or open operation of the window is halted as soon as the hand is released from the operation knob 71 and the knob returns back to the position of the neutral N. In contrast, in the automatic mode, once the operation knob 71 is operated and brought to the position of the automatic close AC or the automatic open AO, after that the close operation or open operation of the window continues even if the hand is released from the operation knob 71 and the knob returns back to the position of the neutral N.

FIG. 30 is a view showing an example of window open/close mechanism arranged on each window of a vehicle. A window glass 51 moves upward/downward upon activation of the window open/close mechanism 52. The window open/close mechanism 52 includes a support member 53, a first arm 54, a second arm 55, a bracket 56, a guide member 57, a pinion 60, and a gear 61. The support member 53 is attached to the lower end of the window glass 51. The first arm 54 is engaged with the support member 53 at one end, and is rotatably supported by the bracket 56 at the other end. The second arm 55 is engaged with the support member 53 at one end, and is engaged with the guide member 57 at the other end. The middle sections of the first arm 54 and the second arm 55 are coupled with each other via a shaft. The pinion 60 is rotationally driven by the motor 58. The motor 58 is coupled with the rotary encoder 59. A fan-shaped gear 61 is fixed to the first arm 54, and meshes with the pinion 60. When the motor 58 rotates, the pinion 60 and the gear 61 rotate, and the first arm 54 pivots. With this movement, the other end of the second arm 55 slides along the groove of the guide member 57 in the lateral direction. As a result, the support member 53 moves in the vertical direction, so that the window glass 51 moves upward/downward, and the window 50 opens or closes.

In the above-described power window apparatus, the motor 58 is driven in a normal rotation direction or in a reverse rotation direction according to the operation of the operation switch 40, and accordingly the window 50 opens and closes. For example, when the motor 58 is driven in the normal rotation direction, the window 50 opens. When the motor 58 is driven in the reverse rotation direction, the window 50 closes. A control circuit (omitted for the figure) of the motor drive apparatus 41 switches the direction of the current flowing in the motor 58, so as to control the normal rotation and the reverse rotation of the motor 58. Conventionally, a mechanical relay (contact relay) has been used as this switching means.

In general, a power window apparatus is equipped with a wetting detection circuit so as to prevent malfunction of the motor when rainwater enters into the apparatus or the apparatus is submerged into water. When the wetting detection circuit detects wetting, and the operation switch performs the open operation of the window, the control circuit rotates the motor in the normal rotation direction based on the normal rotation instruction signal provided by the operation switch and the detection signal provided by the wetting detection circuit. Therefore, the open operation of the window can be normally performed.

Japanese Unexamined Patent Publication Nos. 2000-120330 and 2005-65442 describe a power window apparatus having a wetting detection circuit and a control circuit using a mechanical relay for switching a normal rotation and a reverse rotation of a motor as described above.

SUMMARY

However, in the mechanical relay, the circuit is switched when a moving contact is mechanically driven by the application of current to the coil. Therefore, the mechanical relay generates noise when the contact is switched. An IC (Integrated Circuit) may be used instead of the control circuit using the mechanical relay. When the IC is used, the motor can be driven and controlled only by the input and output of electric signal. Therefore, the IC does not generate noise when the contact is switched, thus eliminating the noise caused by operation.

Meanwhile, the is susceptible to damage when it gets wet. When the vicinity of the connection terminals gets wet, the terminals would be short-circuited to each other, which may cause the IC to malfunction. Especially, when the difference of voltage between the adjacent terminals is large, a current flows from a high-voltage terminal to a low-voltage terminal due to wetting, which may lead to malfunction of the IC.

One or more embodiments of the present invention provides a motor drive apparatus that can prevent malfunction caused by a short-circuit between terminals during wetting.

In accordance with one aspect of the present invention, a motor drive apparatus for driving a motor in a normal rotation direction or a reverse rotation direction in accordance with a state of operation of an operation switch, the motor drive apparatus includes: a first semiconductor switching device that switches ON/OFF state based on a normal rotation instruction provided by the operation switch; a second semiconductor switching device that switches ON/OFF state based on a reverse rotation instruction provided by the operation switch; a control circuit for controlling drive of the motor in the normal rotation direction or the reverse rotation direction, based on the ON/OFF state of the first and second semiconductor switching devices; and a wetting detection circuit for detecting wetting and controlling operation of the first and second semiconductor switching devices. The control circuit includes a first terminal connected to the first semiconductor switching device; a second terminal connected to the second semiconductor switching device; a low level terminal for receiving and outputting a signal having a voltage value lower than a reference voltage value defined in advance; and a high level terminal for receiving and outputting a signal having a voltage value higher than the reference voltage value.

According to a first aspect of the present invention, when the wetting detection circuit detects wetting, the voltage values of the first terminal and the second terminal are less than a reference voltage value. Further, the first terminal and the second terminal are separated from the high level terminal, and are in proximity to the low level terminal.

As described above, the first terminal and the second terminal, which attain low voltage values during wetting, are arranged in proximity to the low level terminal. Accordingly, the voltage difference between the first and second terminals and the low level terminal becomes small. Therefore, the control circuit is less likely to malfunction due to short-circuit between the terminals during wetting.

According to a second aspect of the present invention, when the wetting detection circuit detects wetting, the voltage values of the first terminal and the second terminal are more than the reference voltage value. Further, the first terminal and the second terminal are separated from the low level terminal, and are arranged in proximity to the high level terminal.

As described above, the first terminal and the second terminal, which attain high voltage values during wetting, are arranged in proximity to the high level terminal. Accordingly, the voltage difference between the first and second terminals and the high level terminal becomes small. Therefore, the control circuit is less likely to malfunction due to short-circuit between the terminals during wetting.

In the first and second aspect of the present invention, in a case where the wetting detection circuit detects wetting and where the operation switch outputs the normal rotation instruction, a voltage value of the first terminal may be more than the reference voltage value, and a voltage value of the second terminal may be less than the reference voltage value. In contrast, a voltage value of the first terminal may be less than the reference voltage value, and a voltage value of the second terminal may be more than the reference voltage value.

According to a third aspect of the present invention, when the wetting detection circuit detects wetting, the voltage value of one of the first terminal and the second terminal is less than the reference voltage value, and the voltage value of the other of the first terminal and the second terminal is more than the reference voltage value. Further, the one of the first terminal and the second terminal is separated from the high level terminal, and is arranged in proximity to the low level terminal. The other of the first terminal and the second terminal is separated from the low level terminal, and is arranged in proximity to the high level terminal.

As described above, the terminal, which attains low voltage value during wetting, is arranged in proximity to the low level terminal. Accordingly, the voltage difference between the terminal and the low level terminal becomes small. Further, the terminal, which attains high voltage value during wetting, is arranged in proximity to the high level terminal. Accordingly, the voltage difference between the terminal and the high level terminal becomes small. Therefore, the control circuit is less likely to malfunction due to short-circuit between the terminals during wetting.

According to one or more embodiments of the present invention, the low level terminal is typically a terminal connected to a ground. The high level terminal is typically a terminal connected to a power supply. In this case, the terminal connected to the motor has a relatively high voltage. Therefore, the terminal is preferably arranged in proximity to the high level terminal.

According to one or more embodiments of the present invention, the control circuit is contained in the package of the IC. The low level terminal is arranged on one side of the package. The high level terminal is arranged on the other side of the package. With this arrangement, the first and second terminals are reliably separated from the high level terminal or the low level terminal. Therefore, it is possible to effectively prevent malfunction due to short-circuit between the terminals during wetting.

According to one or more embodiments of the present invention, the motor drive apparatus can be provided that can prevent malfunction caused by short-circuit between terminals during wetting.

DETAILED DESCRIPTION

Figure 1:
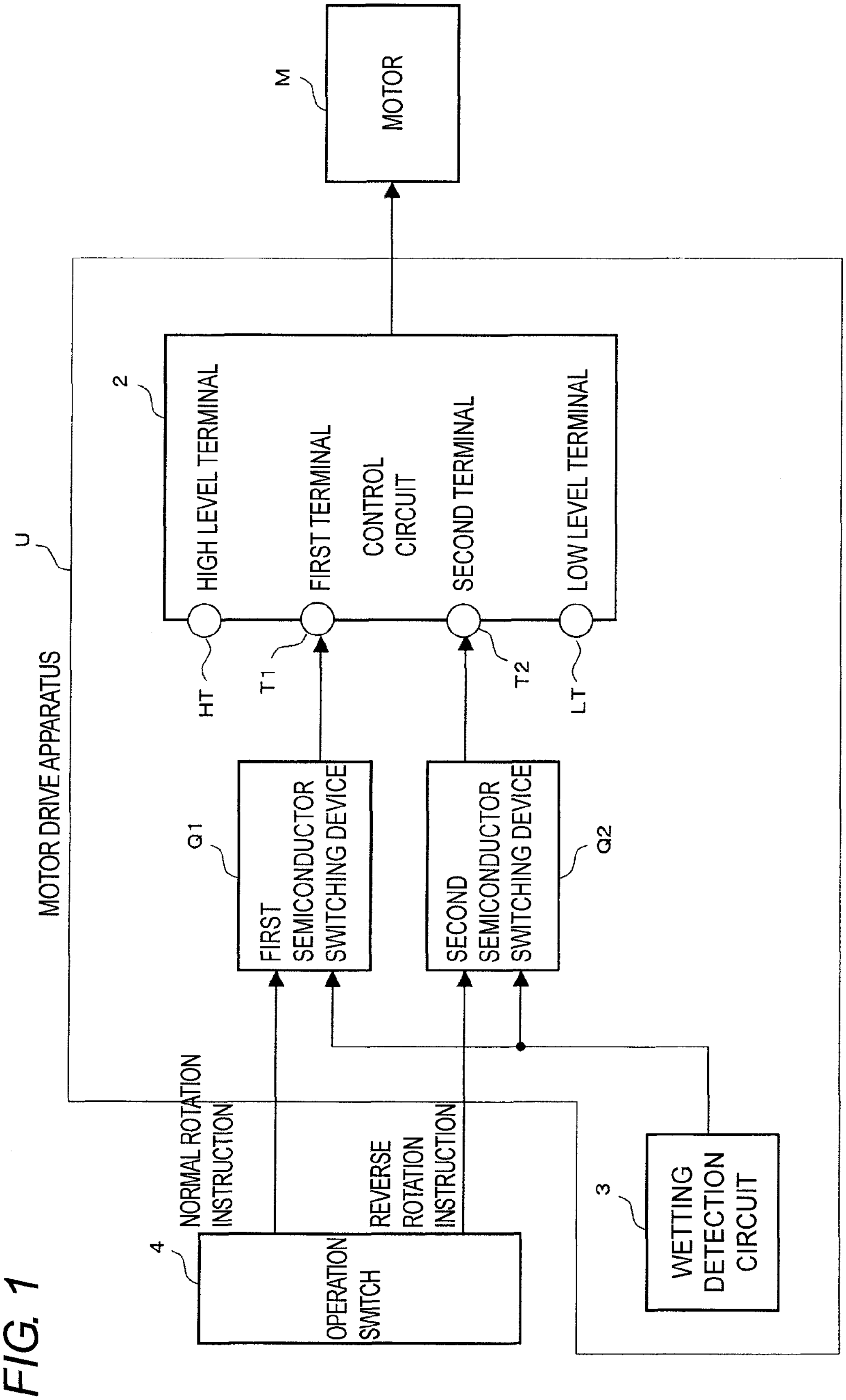
FIG. 1 is a block diagram showing a basic configuration according to one or more embodiments of the present invention.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a block diagram showing a basic configuration according to one or more embodiments of the present invention. A motor drive apparatus U includes a first semiconductor switching device Q1, a second semiconductor switching device Q2, a control circuit 2, and a wetting detection circuit 3. An ON/OFF state of the first semiconductor switching device Q1 is switched based on the normal rotation instruction given by an operation switch 4. An ON/OFF state of the second semiconductor switching device Q2 is switched based on the reverse rotation instruction given by the operation switch 4. The control circuit 2 drives and controls a motor M in the normal rotation direction or the reverse rotation direction based on the ON/OFF states of the first semiconductor switching device Q1 and the second semiconductor switching device Q2. The wetting detection circuit 3 detects wetting, and controls the operation of the semiconductor switching devices Q1 and Q2. The control circuit 2 includes a first terminal T1 connected to the first semiconductor switching device Q1, a second terminal T2 connected to the second semiconductor switching device Q2, a low level terminal LT that receives or outputs a signal having a voltage value lower than a reference voltage value, and a high level terminal HT that receives or outputs a signal having a voltage value higher than the reference voltage value. The reference voltage value is a voltage value defined in advance, and is between a voltage value of a power supply (omitted from the figure) connected to the motor drive apparatus U and a voltage value of a ground (omitted from the figure) connected to the motor drive apparatus U.

A power window apparatus in a vehicle according to one or more embodiments of the present invention will be hereinafter described with reference to the drawings. It should be noted that in FIG. 2 to FIG. 23, the same or corresponding elements as those of FIG. 1 are given the same reference numerals as those of FIG. 1.

Figure 2:
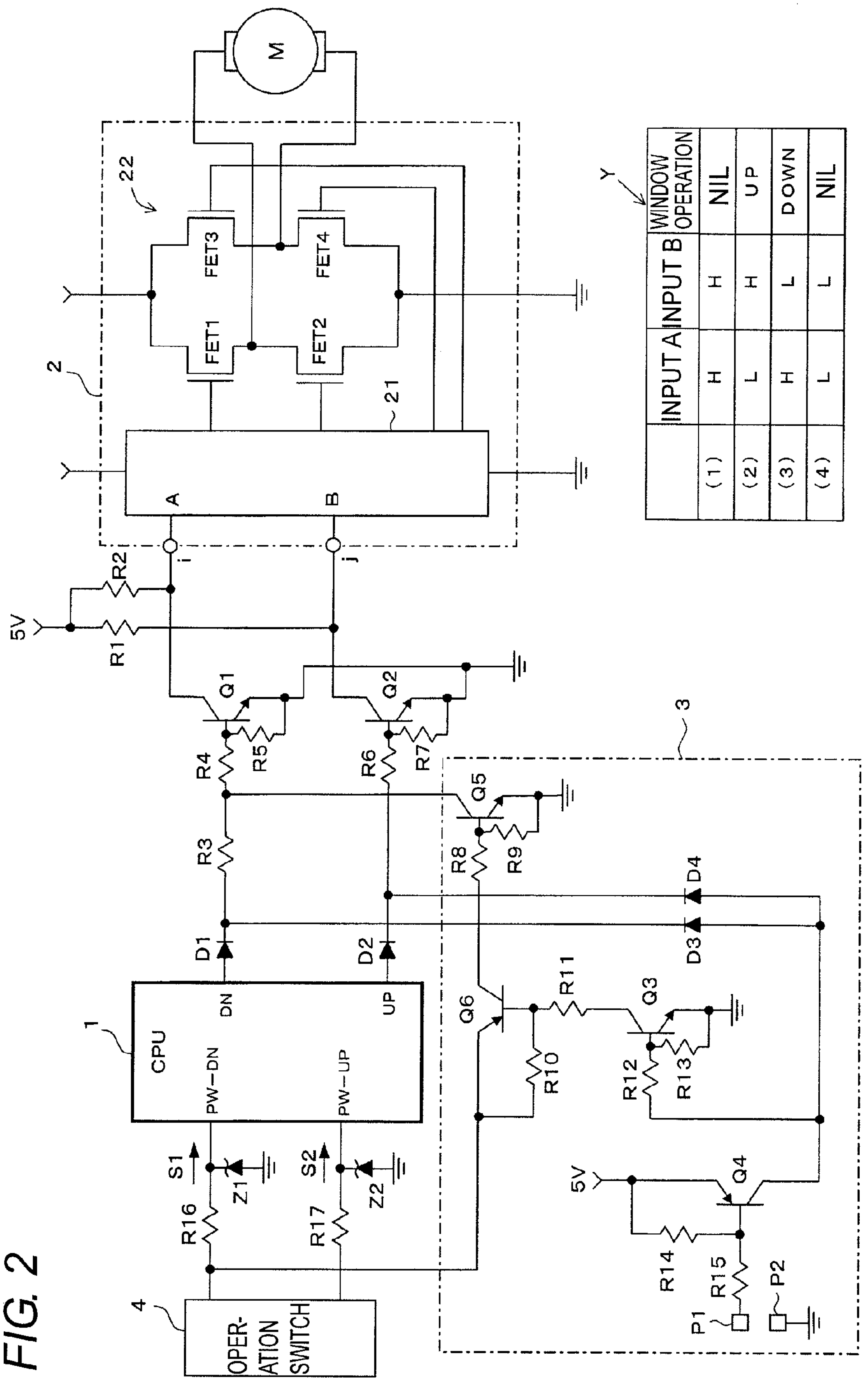
FIG. 2 is a circuit diagram of a motor drive apparatus according to a first embodiment of the present invention.

FIG. 2 is a circuit diagram of the motor drive apparatus (power window apparatus) according to a first embodiment of the present invention.

An input side of a CPU 1 is connected to the operation switch 4 that outputs a normal rotation instruction or a reverse rotation instruction according to the state of operation. A normal rotation instruction S1 outputted from the operation switch 4 is a signal for driving the motor M in the normal rotation direction to open the window, and is inputted to a window-open signal input terminal (PW-DN) of the CPU 1 via a resistor R16 and a voltage-regulator diode Z1. A reverse rotation instruction S2 outputted from the operation switch 4 is a signal for driving the motor M in the reverse rotation direction to close the window, and is inputted to a window-close signal input terminal (PW-UP) of the CPU 1 via a resistor R17 and a voltage-regulator diode Z2.

An output side of the CPU 1 is connected to a transistor Q1 (the first semiconductor switching device) and a transistor Q2 (the second semiconductor switching device). These transistors Q1 and Q2 are NPN-type transistors. The ON/OFF state of the transistor Q1 is switched based on the normal rotation instruction S1. The ON/OFF state of the transistor Q2 is switched based on the reverse rotation instruction S2.

The base of the transistor Q1 is connected to a window-open signal output terminal (DN) of the CPU 1 via a diode D1 and resistors R3 and R4. A resistor R5 is connected between the base and emitter of the transistor Q1. The collector of the transistor Q1 is connected to the power supply (5V) via a resistor R2, and is also connected to a terminal i of the control circuit 2. The emitter of the transistor Q1 is grounded.

The base of the transistor Q2 is connected to a window-close signal output terminal (UP) of the CPU 1 via a diode D2 and a resistor R6. A resistor R7 is connected between the base and emitter of the transistor Q2. The collector of the transistor Q2 is connected to the power supply (5V) via a resistor R1, and is also connected to a terminal j of the control circuit 2. The emitter of the transistor Q2 is grounded.

The control circuit 2 is a circuit for driving and controlling the motor M in the normal rotation direction or the reverse rotation direction in accordance with the ON/OFF states of the transistors Q1 and Q2, and includes a logic circuit 21 and a drive circuit 22. The logic circuit 21 individually outputs a "H" (High) or "L" (Low) signal to the gate of each of FETs (Field Effect Transistors) 1 to 4 configuring the drive circuit 22 according to the level of signals provided to the terminals i and j. The drive voltage is provided to the motor M from a connection point between the FET 1 and the FET 2 and a connection point between the FET 3 and the FET 4. The control circuit 2 is contained in a package of a later-described IC (Integrated Circuit). It should be noted that the terminal i and the terminal j respectively correspond to the first terminal T1 and the second terminal T2 of FIG. 1.

The wetting detection circuit 3 includes a pair of electrode pads P1 and P2, switching transistors Q3 to Q6, resistors R8 to R15, and diodes D3 and D4. The electrode pads P1 and P2 are short-circuited by water during wetting. The electrode pad P2 is grounded. The electrode pad P1 is connected to the base of the transistor Q4 via the resistor R15. The emitter of the transistor Q4 is connected to the power supply (5V). The resistor R14 is connected between the base and emitter of the transistor Q4. The collector of the transistor Q4 is connected to the base of the transistor Q3 via the resistor R12. The collector of the transistor Q4 is connected to the connection point between the diode D1 and the resistor R3 via the diode D3, and is also connected to the connection point between the diode D2 and the resistor R6 via the diode D4.

The resistor R13 is connected between the base and emitter of the transistor Q3. The emitter of the transistor Q3 is grounded. The collector of the transistor Q3 is connected to the base of the transistor Q6 via the resistor R11. The emitter of the transistor Q6 is connected to one end of the resistor R16. The resistor R10 is connected between the base and emitter of the transistor Q6. The collector of the transistor Q6 is connected to the base of the transistor Q5 via the resistor R8. The emitter of the transistor Q5 is grounded, and the collector thereof is connected to the connection point between the resistor R3 and the resistor R4. The resistor R9 is connected between the base and emitter of the transistor Q5.

A table denoted by a reference symbol Y represents relationship between the level of signal (input A) that is inputted to the terminal i of the control circuit 2, the level of signal (input B) that is inputted to the terminal j, and the window open/close operation performed by the motor M. "H" denotes high level, "L" denotes low level, "UP" denotes window close operation, and "DOWN" denotes window open operation. "Nil" indicates that no open/close operation of the window is performed. The details of the window open/close operation will be hereinafter described in order.

Operation of the motor drive apparatus according to the first embodiment thus structured will now be described.

Figure 3:
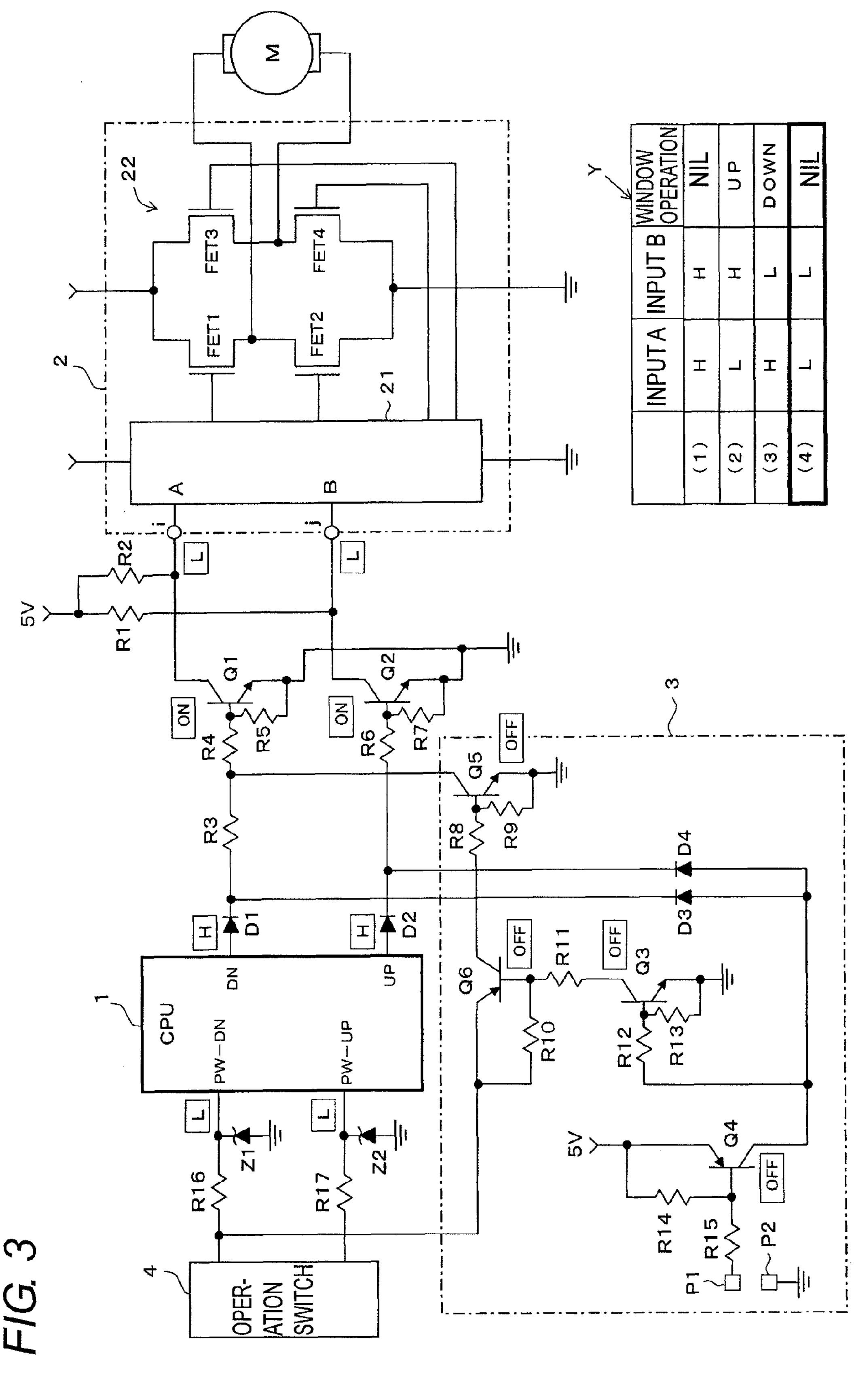
FIG. 3 is a circuit diagram for illustrating operation of the first embodiment in a normal time.

FIG. 3 shows a state of the circuit in a normal time (which means, throughout this specification, a non-wet state), when the operation switch 4 is not operated. Because no instruction is given by the operation switch 4, both of the window-open signal input terminal (PW-DN) and a window-close signal input terminal (PW-UP) of the CPU 1 are "L" level. At this moment, the window-open signal output terminal (DN) and the window-close signal output terminal (UP) of the CPU 1 are "H" level. On the other hand, in the wetting detection circuit 3, the electrode pads P1 and P2 are not short-circuited by water, and accordingly, the transistor Q4 is OFF state, and the transistors Q3, Q5 and Q6 are also OFF state. Therefore, the base of the transistor Q1 attains "H" level, and the transistor Q1 turns on. Also, the base of the transistor Q2 attains "H" level, and the transistor Q2 turns on. Because the transistor Q1 turns on, the terminal i of the control circuit 2 is grounded via the transistor Q1, and accordingly attains "L" level. Because the transistor Q2 turns on, the terminal j of the control circuit 2 is grounded via the transistor Q2, and accordingly the terminal j also attains "L" level. Therefore, as shown in the row (4) in a table Y, the input A attains "L", and the input B attains "L", so that the open/close operation of the window is not performed. In other words, in this case, the output signal provided by the logic circuit 21 causes all of the FETs 1 to 4 in the drive circuit 22 to turn off, so that the motor M is not driven.

Figure 4:
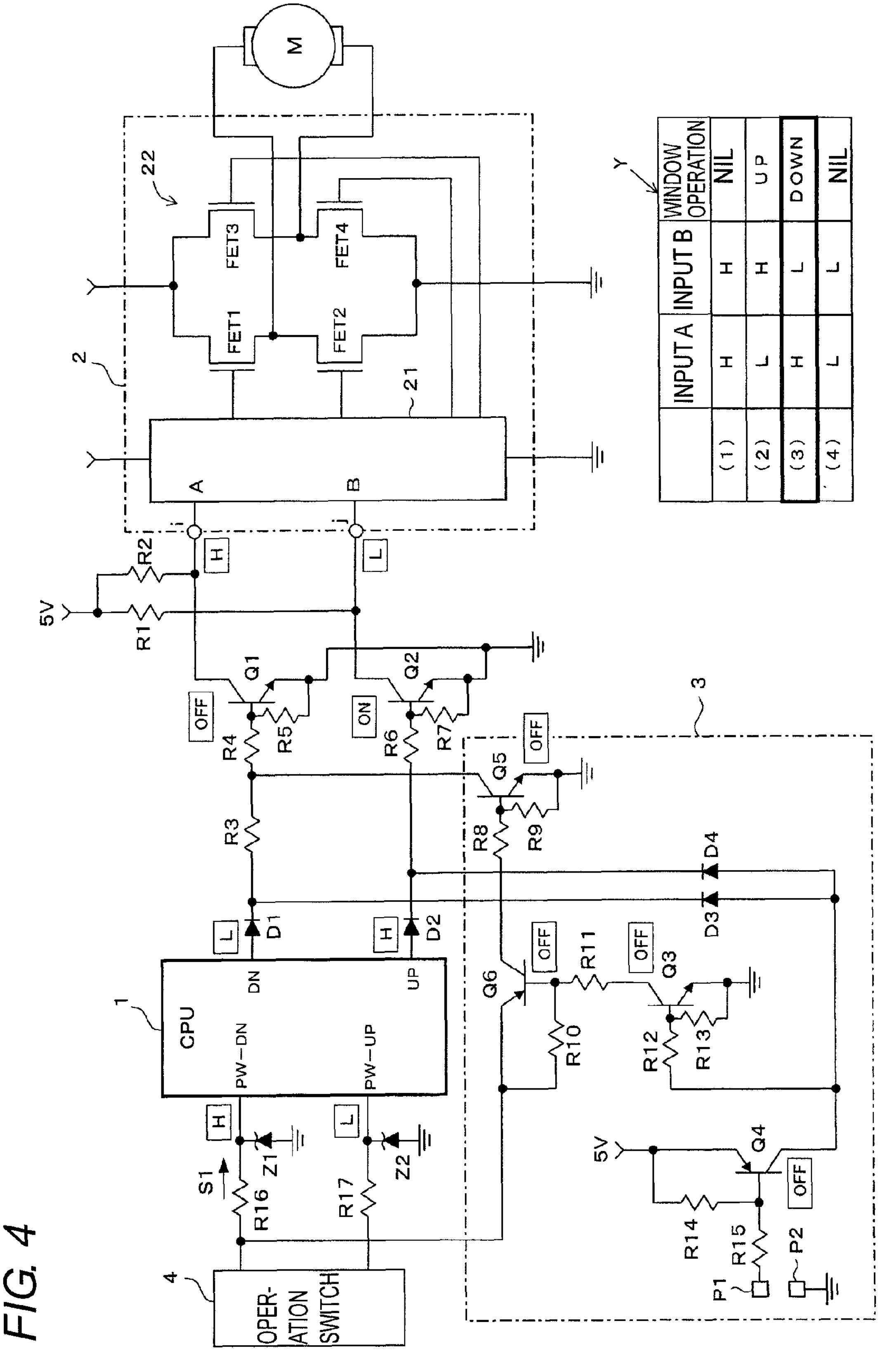
FIG. 4 is a circuit diagram for illustrating operation of the first embodiment in a normal time.

FIG. 4 shows a state of the circuit in the normal time, when the window-open operation is performed with the operation switch 4. In response to the normal rotation instruction S1 provided by the operation switch 4, the window-open signal input terminal (PW-DN) of the CPU 1 attains "H" level. On the other hand, the window-close signal input terminal (PW-UP) is still at "L" level. Accordingly, the window-open signal output terminal (DN) of the CPU 1 attains "L" level, and the window-close signal output terminal (UP) attains "H" level. Meanwhile, in the wetting detection circuit 3, the electrode pads P1 and P2 are not short-circuited by water as in the case of FIG. 3, and accordingly the transistors Q3 to Q6 are OFF state. Therefore, the base of the transistor Q1 attains "L" level, and the transistor Q1 turns off. On the other hand, the base of the transistor Q2 is still at "H" level, and the transistor Q2 maintains ON state. Since the transistor Q1 is OFF state and the transistor Q2 is ON state, the terminal i of the control circuit 2 attains "H" level, and the terminal j attains "L" level. Therefore, as shown in the row (3) in the table Y, the input A attains "H" and the input B attains "L", and accordingly the window-open operation (DOWN operation) is performed. In other words, in this case, according to the output signal provided by the logic circuit 21, the FET 1 and the FET 4 of the drive circuit 22 turn on, and the FET 2 and FET 3 turn off, so that the motor M is driven in the normal rotation direction, which causes the window to open.

Figure 5:
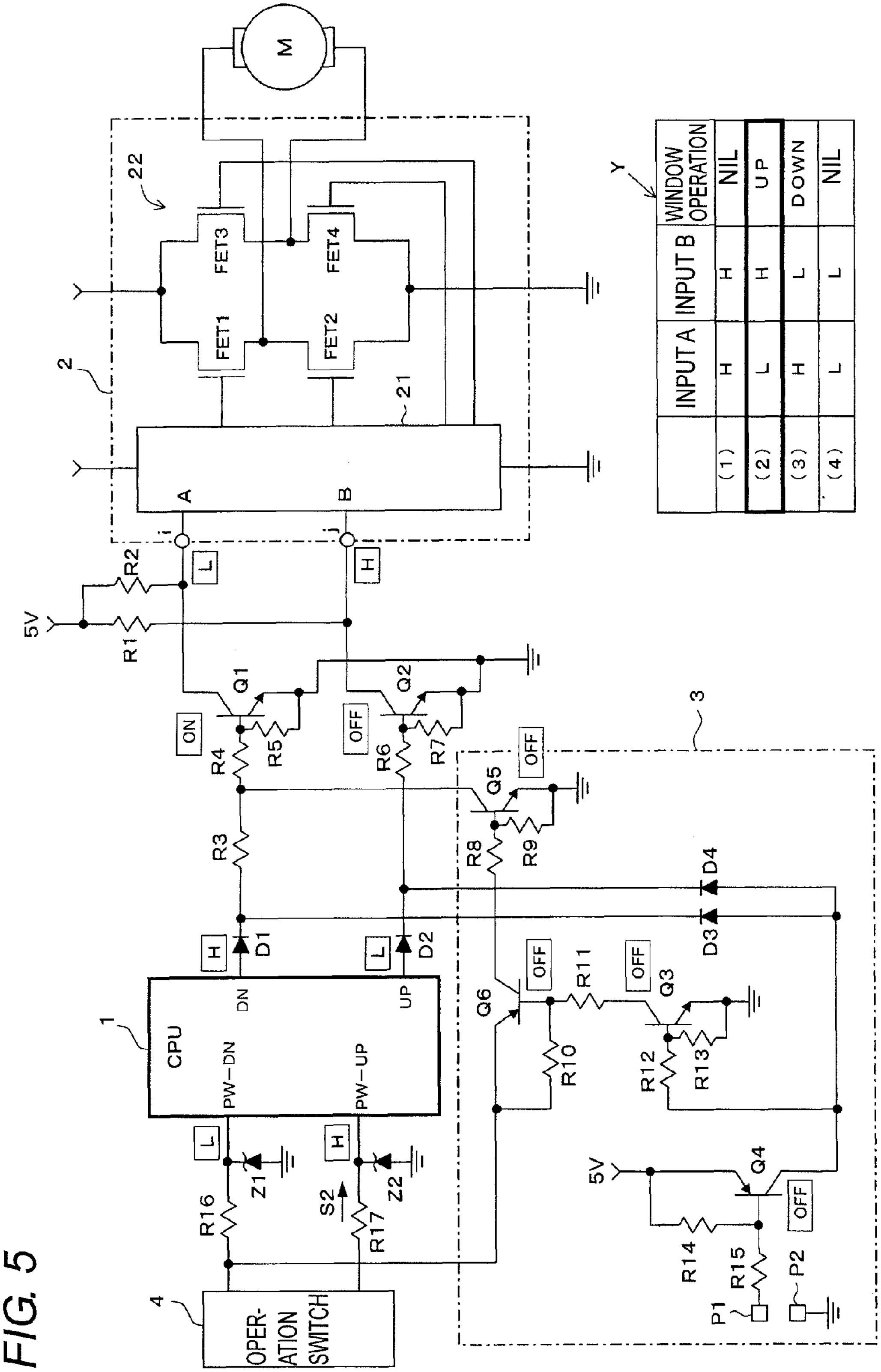
FIG. 5 is a circuit diagram for illustrating operation of the first embodiment in a normal time.

FIG. 5 shows a state of the circuit in the normal time, when the window-close operation is performed with the operation switch 4. In response to the reverse rotation instruction S2 provided by the operation switch 4, the window-close signal input terminal (PW-UP) of the CPU 1 attains "H" level. On the other hand, the window-open signal input terminal (PW-DN) is still at "L" level. Accordingly, the window-open signal output terminal (DN) of the CPU 1 attains "H" level, and the window-close signal output terminal (UP) attains "L" level. Meanwhile, in the wetting detection circuit 3, the electrode pads P1 and P2 are not short-circuited by water as in the case of FIG. 3, and accordingly the transistors Q3 to Q6 are OFF state. Therefore, the base of the transistor Q2 attains "L" level, and the transistor Q2 turns off. On the other hand, the base of the transistor Q1 is still at "H" level, and the transistor Q1 maintains ON state. Since the transistor Q1 is ON state and the transistor Q2 is OFF state, the terminal i of the control circuit 2 attains "L" level, and the terminal j attains "H" level. Therefore, as shown in the row (2) in the table Y, the input A attains "L" and the input B attains "H", and accordingly the window-close operation (UP operation) is performed. In other words, in this case, according to the output signal provided by the logic circuit 21, the FET 2 and the FET 3 of the drive circuit 22 turn on, and the FET 1 and FET 4 turn off, so that the motor M is driven in the reverse rotation direction, which causes the window to close.

Figure 6:
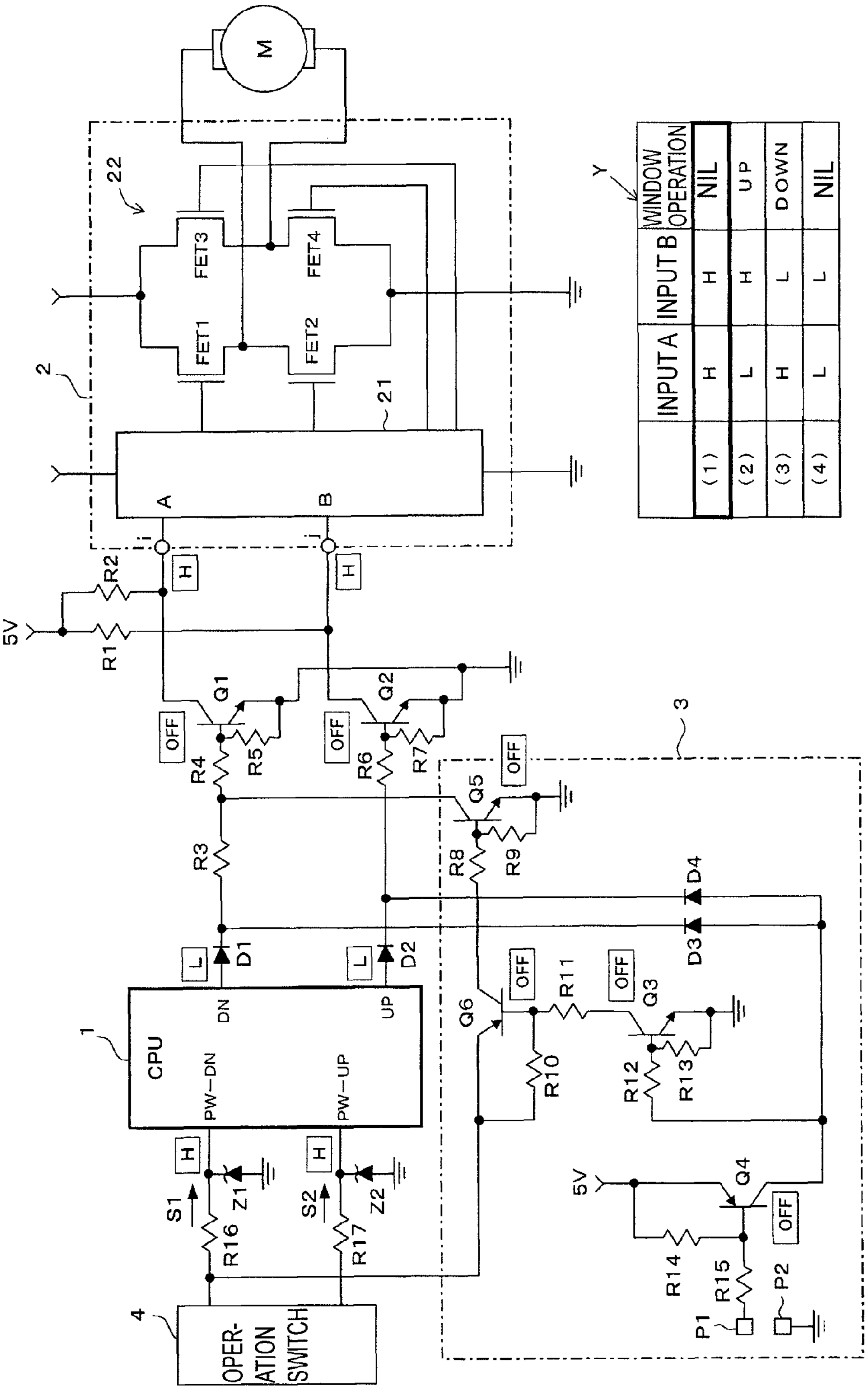
FIG. 6 is a circuit diagram for illustrating operation of the first embodiment in a normal time.

FIG. 6 shows a state of the circuit when the normal rotation instruction S1 and the reverse rotation instruction S2 are inputted from the operation switch 4 at a time. In normal circumstances, both of the instructions are never given at a time, but this may happen when the operation switch 4 breaks down. In this case, both of the window-open signal output terminal (DN) and the window-close signal output terminal (UP) of the CPU 1 attain "L" level, and both of the transistors Q1 and Q2 attain OFF state. Therefore, both of the terminals i and j attain "H" level. Therefore, as shown in the row (1) of the table Y, the input A attains "H" and the input B attains "H", and accordingly the open/close operation of the window is not performed. In other words, in this case, according to the output signal provided by the logic circuit 21, all of the FETs 1 to 4 in the drive circuit 22 turn off, so that the motor M is not driven.

Figure 7:
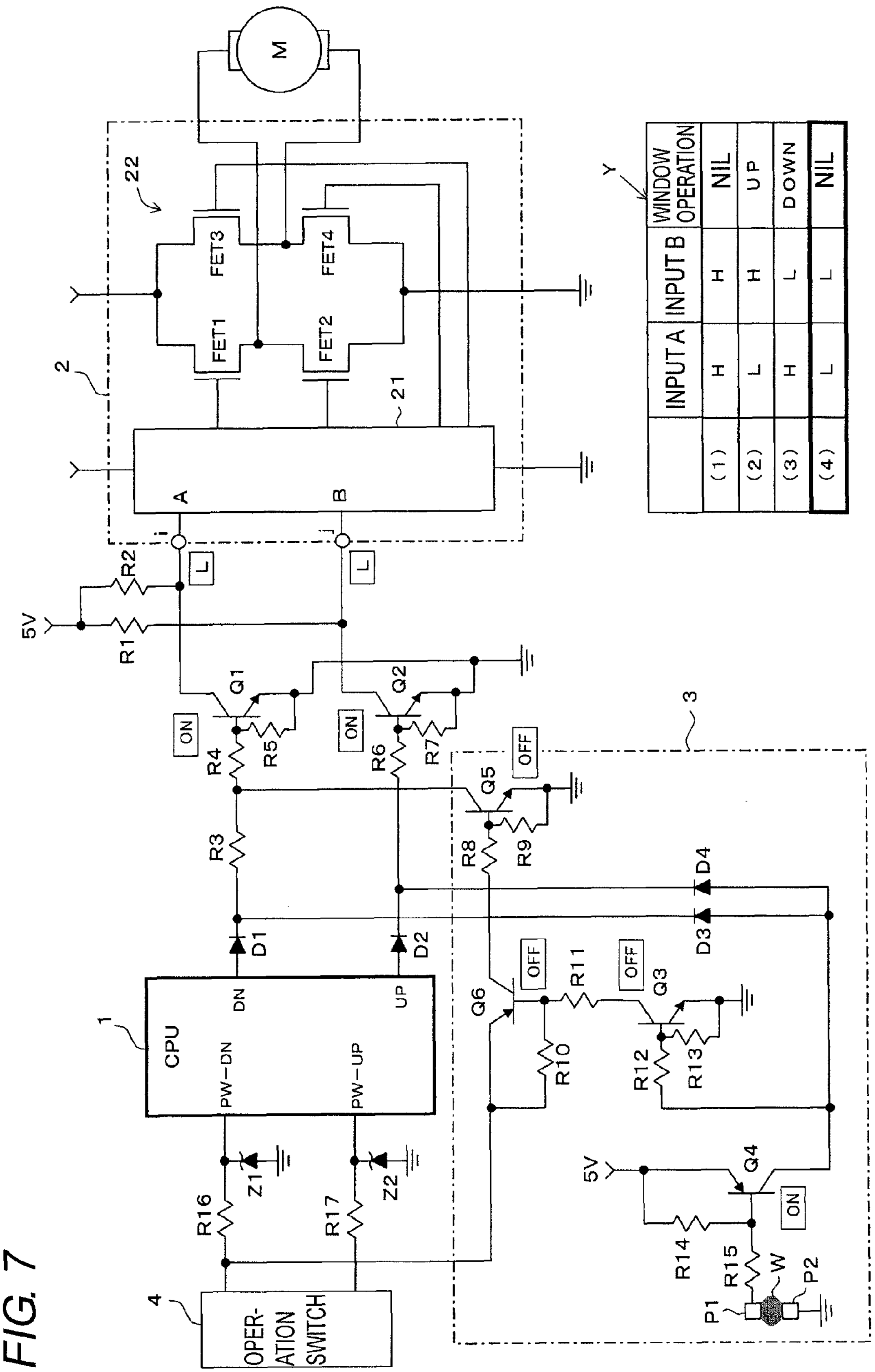
FIG. 7 is a circuit diagram for illustrating operation of the first embodiment during wetting.

FIG. 7 shows a state of the circuit when wetting occurs while the operation switch 4 is not operated. In this case, in the wetting detection circuit 3, the electrode pads P1 and P2 are short-circuited by water W, and consequently the transistor Q4 turns on. When the transistor Q4 turns on, a current flows between the emitter and collector of this transistor Q4, and this current flows into the base of the transistor Q1 via the diode D3. Therefore, regardless of the level of the window-open signal output terminal (DN), the transistor Q1 turns on. Further, the current between the emitter and collector of the transistor Q4 flows into the base of the transistor Q2 via the diode D4. Therefore, regardless of the level of the window-close signal output terminal (UP), the transistor Q2 also turns on. On the other hand, the current between the emitter and collector of the transistor Q4 also flows into the base of the transistor Q3, but since the transistor Q6 is OFF state, the transistor Q3 does not turn on either, i.e., is OFF state. The transistor Q5 is also OFF state. When the transistors Q1 and Q2 turn on, both of the terminals i and j attain "L" level. Therefore, when the operation switch 4 is not operated (open-operation described below) while wetting occurs, the input A attains "L" and the input B attains "L" as shown in row (4) of the table Y, so that the open/close operation of the window is not performed.

Figure 8:
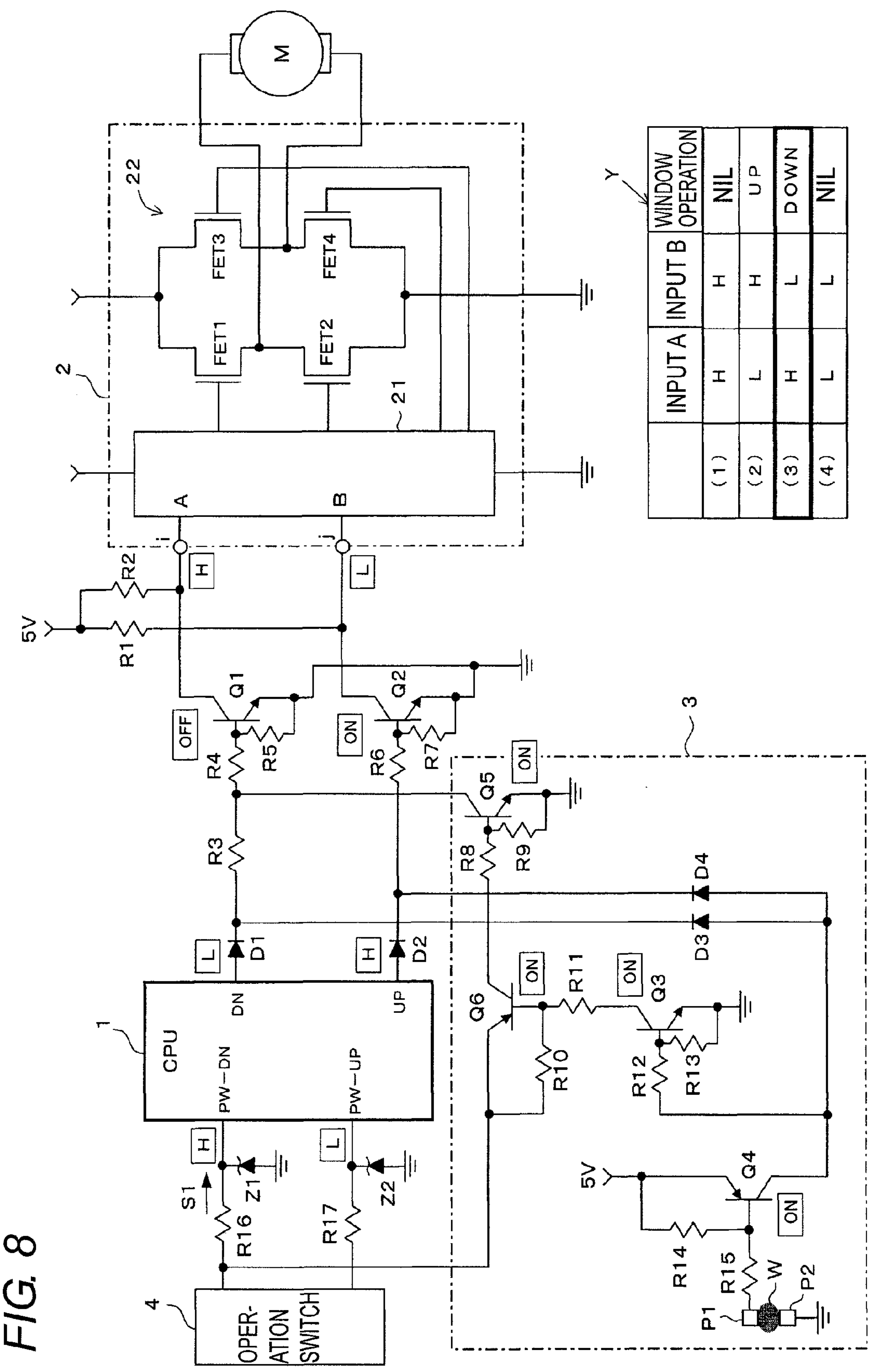
FIG. 8 is a circuit diagram for illustrating operation of the first embodiment during wetting.

Subsequently, when the window-open operation is performed with the operation switch 4 in the state of FIG. 7, the window-open signal input terminal (PW-DN) of the CPU 1 attains "H" level according to the normal rotation instruction S1 as shown in FIG. 8. On the other hand, the window-close signal input terminal (PW-UP) maintains "L" level. Therefore, the window-open signal output terminal (DN) of the CPU 1 attains "L" level, and the window-close signal output terminal (UP) attains "H" level. On the other hand, in the wetting detection circuit 3, the electrode pads P1 and P2 are short-circuited by the water W, which causes the transistor Q4 to turn on, and accordingly, a current flows between the emitter and collector of the transistor Q4. Therefore, unlike the case of FIG. 7, in response to the normal rotation instruction S1, the transistor Q3 turns on, and therefore, the transistor Q6 turns on, so that the transistor Q5 also turns on. Accordingly, when the transistor Q5 turns on, the base of the transistor Q1 attains "L" level, and transistor Q1 turns off. On the other hand, the base of the transistor Q2 maintains "H" level, and the transistor Q2 maintains ON state. When the transistor Q1 turns off and the transistor Q2 turns on, the terminal i of the control circuit 2 attains "H" level, and the terminal j attains "L" level. Therefore, as shown in the row (3) in the table Y, the input A attains "H" and the input B attains "L", so that the window-open operation (DOWN operation) is performed. In other words, when the window-open operation is performed with the operation switch 4 during wetting, the motor M is driven in normal rotation direction, so that the window opens.

Figure 9:
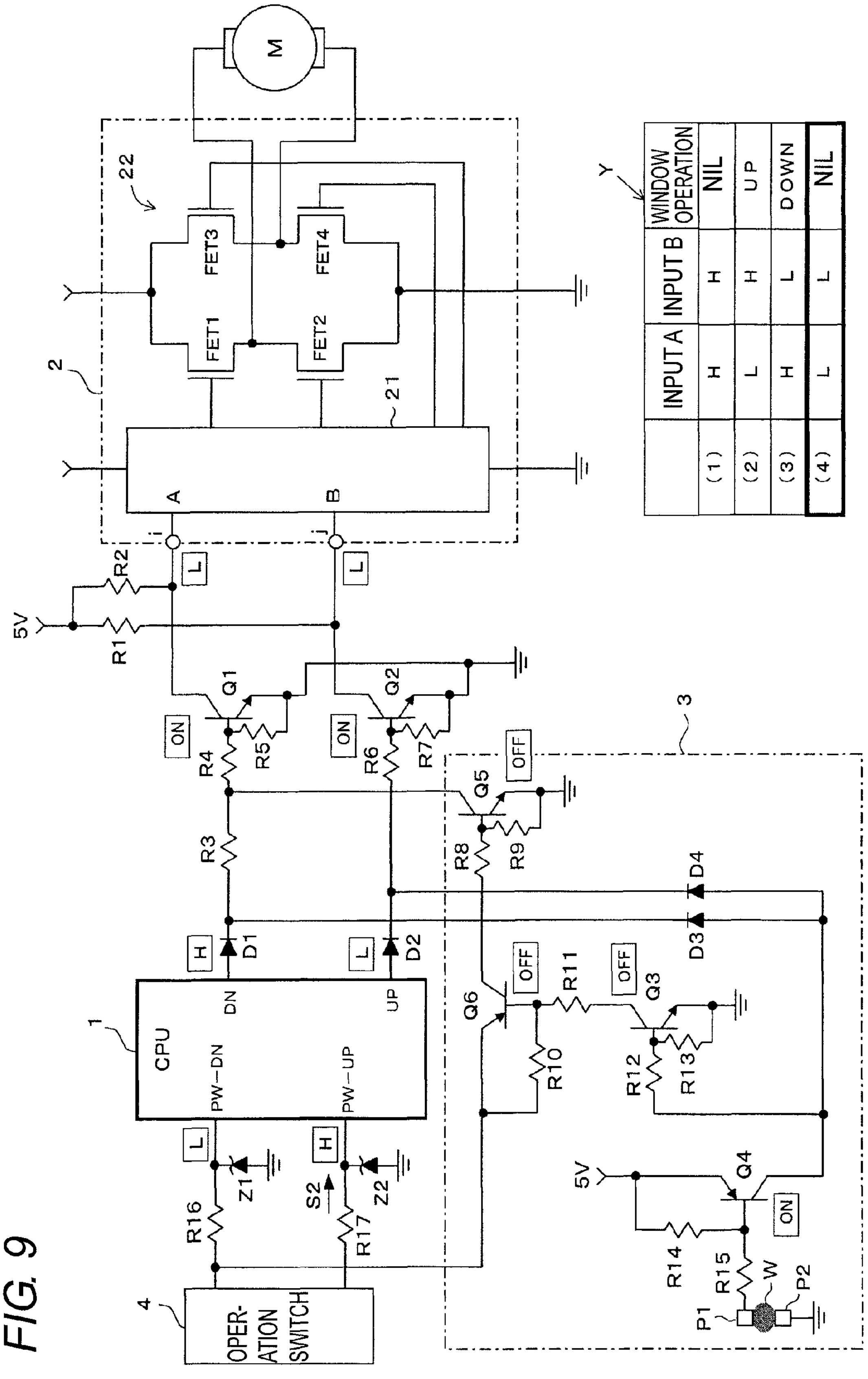
FIG. 9 is a circuit diagram for illustrating operation of the first embodiment during wetting.

On the other hand, the window-close operation is not performed even when the operation switch 4 is operated in order to close the window in the state of FIG. 7. In this case, according to the reverse rotation instruction S2 provided by the operation switch 4, the window-close signal input terminal (PW-UP) of the CPU 1 attains "H" level, and the window-open signal input terminal (PW-DN) attains "L" level, as shown in FIG. 9. Therefore, the window-open signal output terminal (DN) attains "H" level, and the window-close signal output terminal (UP) "L" level. On the other hand, since the transistors Q3 and Q6 in the wetting detection circuit 3 do not turn on, the transistor Q5 also turns off. Therefore, the base of the transistor Q1 attains "H" level, and accordingly the transistor Q1 turns on. Although the window-close signal output terminal (UP) is at "L" level, the base of the transistor Q2 is provided with a current from the transistor Q4 via the diode D4, and accordingly, the transistor Q2 also turns on. Therefore, both of the terminals i and j attain "L" level, and accordingly the input A attains "L" and the input B attains "L" as shown in the row (4) of the table Y, so that the window-close operation is not performed.

Figure 10:
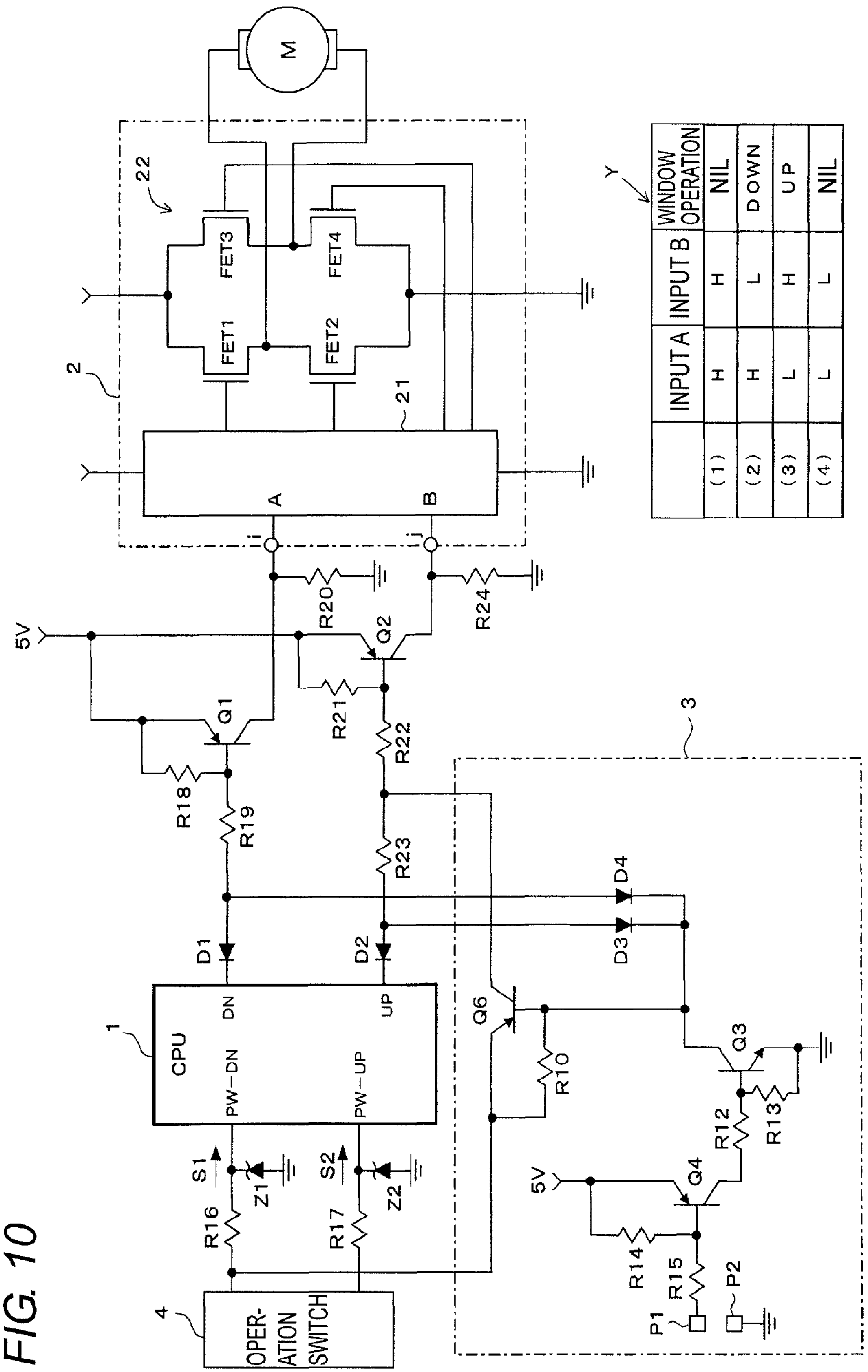
FIG. 10 is a circuit diagram of a motor drive apparatus according to a second embodiment of the present invention.

FIG. 10 is circuit diagram of a motor drive apparatus (power window apparatus) according to a second embodiment of the present invention. It should be noted that in FIG. 10, the same or corresponding elements as those of FIG. 2 are given the same reference numerals as those of FIG. 2.

The input side of the CPU 1 is connected to the operation switch 4 that outputs the normal rotation instruction or the reverse rotation instruction according to the state of operation. The normal rotation instruction S1 outputted from the operation switch 4 is a signal for driving the motor M in the normal rotation direction to open the window, and is inputted to the window-open signal input terminal (PW-DN) of the CPU 1 via the resistor R16 and the voltage-regulator diode Z1. The reverse rotation instruction S2 outputted from the operation switch 4 is a signal for driving the motor M in the reverse rotation direction to close the window, and is inputted to the window-close signal input terminal (PW-UP) of the CPU 1 via the resistor R17 and a voltage-regulator diode Z2.

The output side of the CPU 1 is connected to the transistor Q1 (the first semiconductor switching device) and the transistor Q2 (the second semiconductor switching device). Unlike the case of FIG. 2, these transistors Q1 and Q2 are PNP-type transistors. The ON/OFF state of the transistor Q1 is switched based on the normal rotation instruction S1. The ON/OFF state of the transistor Q2 is switched based on the reverse rotation instruction S2.

The base of the transistor Q1 is connected to the window-open signal output terminal (DN) of the CPU 1 via the diode D1 and a resistor R19. A resistor R18 is connected between the base and emitter of the transistor Q1. The collector of the transistor Q1 is connected to the terminal i of the control circuit 2, and is also grounded via a resistor R20. The emitter of the transistor Q1 is connected to the power supply (5V).

The base of the transistor Q2 is connected to the window-close signal output terminal (UP) of the CPU 1 via the diode D2, a resistor R22, and a resistor R23. A resistor R21 is connected between the base and emitter of the transistor Q2. The collector of the transistor Q2 is connected to the terminal j of the control circuit 2, and is also grounded via a resistor R24. The emitter of the transistor Q2 is connected to the power supply (5V).

The control circuit 2 is a circuit for driving and controlling the motor M in the normal rotation direction and the reverse rotation direction in accordance with the ON/OFF states of the transistors Q1 and Q2, and includes the logic circuit 21 and the drive circuit 22. The logic circuit 21 individually outputs a "H" (High) or "L" (Low) signal to the gate of each of FETs (Field Effect Transistors) 1 to 4 configuring the drive circuit 22 according to the level of signals provided to the terminals i and j. The drive voltage is provided to the motor M from the connection point between the FET 1 and the FET 2 and a connection point between the FET 3 and the FET 4. The control circuit 2 is contained in the package of the later-described IC. It should be noted that the terminal i and the terminal j respectively correspond to the first terminal T1 and the second terminal T2 of FIG. 1.

The wetting detection circuit 3 includes the pair of electrode pads P1 and P2, switching transistors Q3, Q4, Q6, the resistor R10, the resistors R12 to R15, and the diodes D3 and D4. The electrode pads P1 and P2 are short-circuited by water during wetting. The electrode pad P2 is grounded. The electrode pad P1 is connected to the base of the transistor Q4 via the resistor R15. The emitter of the transistor Q4 is connected to the power supply (5V). The resistor R14 is connected between the base and emitter of the transistor Q4. The collector of the transistor Q4 is connected to the base of the transistor Q3 via the resistor R12. The resistor R13 is connected between the base and emitter of the transistor Q3. The emitter of the transistor Q3 is grounded.

The collector of the transistor Q3 is connected to a connection point between the diode D2 and the resistor R23 via the diode D3, and is connected to a connection point between the diode D1 and the resistor R19 via the diode D4. The collector of the transistor Q3 is connected to the base of the transistor Q6. The emitter of the transistor Q6 is connected to one end of the resistor R16. The resistor R10 is connected between the base and emitter of the transistor Q6. The collector of the transistor Q6 is connected to a connection point between the resistor R22 and the resistor R23.

The table denoted by the reference symbol Y represents relationship between the level of signal (input A) that is inputted to the terminal i of the control circuit 2, the level of signal (input B) that is inputted to the terminal j, and the window open/close operation performed by the motor M. "H" denotes high level, "L" denotes low level, "UP" denotes window close operation, and "DOWN" denotes window open operation. "Nil" indicates that no open/close operation of the window is performed. The details of the window open/close operation will be hereinafter described in order.

Operation of the motor drive apparatus according to the second embodiment thus structured will now be described.

Figure 11:
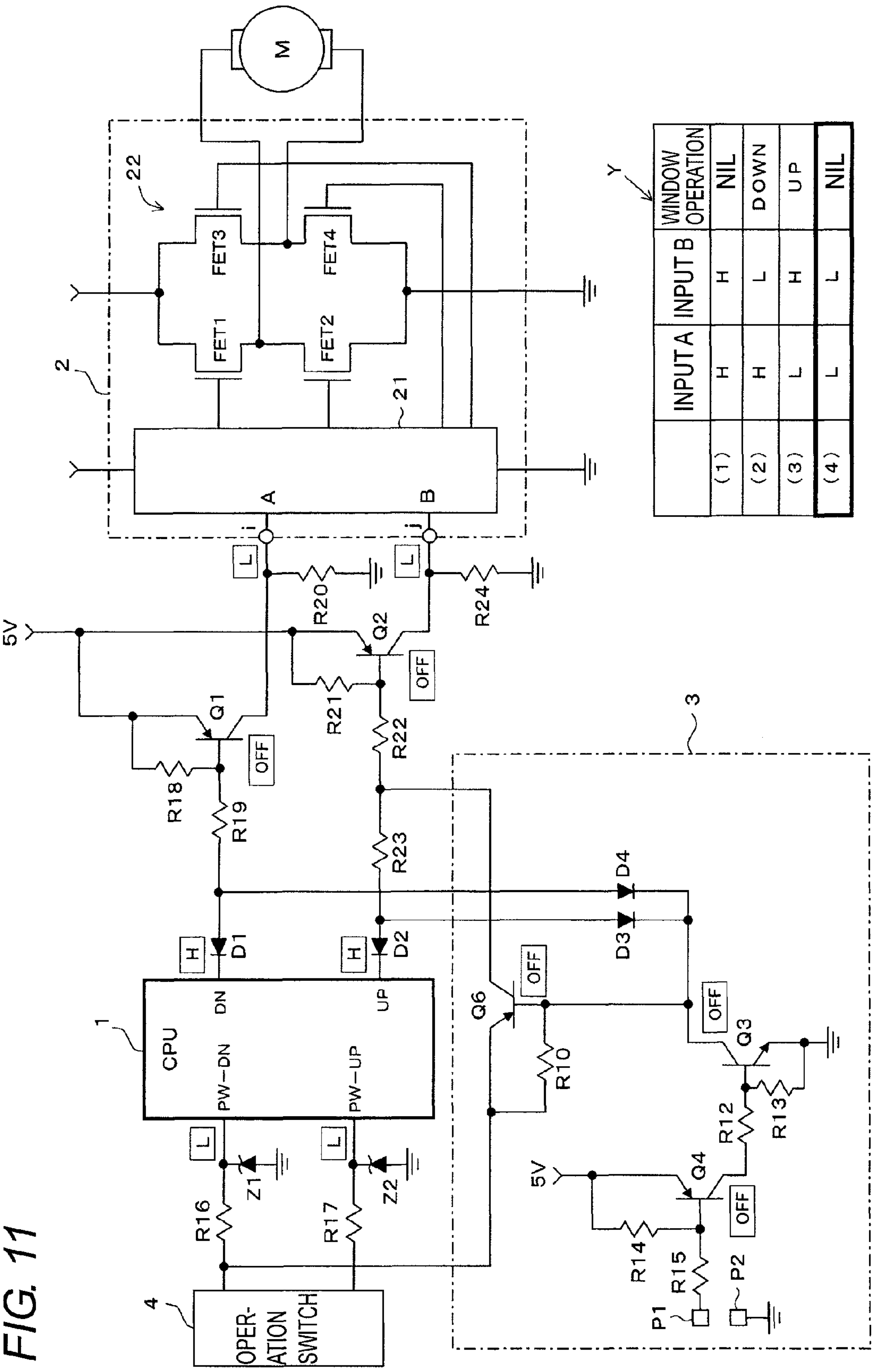
FIG. 11 is a circuit diagram for illustrating operation of the second embodiment in a normal time.

FIG. 11 shows a state of the circuit in the normal time, when the operation switch 4 is not operated. Because no instruction is given by the operation switch 4, both of the window-open signal input terminal (PW-DN) and a window-close signal input terminal (PW-UP) of the CPU 1 are "L" level. At this moment, the window-open signal output terminal (DN) and the window-close signal output terminal (UP) of the CPU 1 are "H" level. On the other hand, in the wetting detection circuit 3, the electrode pads P1 and P2 are not short-circuited by water, and accordingly, the transistor Q4 is OFF state, and the transistors Q3 and Q6 are also OFF state. Therefore, the base of the transistor Q1 attains "H" level, and the transistor Q1 turns off. Also, the base of the transistor Q2 attains "H" level, and the transistor Q2 turns off. Because the transistor Q1 turns off, the terminal i of the control circuit 2 attains "L" level. Because the transistor Q2 turns off, the terminal j of the control circuit 2 also attains "L" level. Therefore, as shown in the row (4) in a table Y, the input A attains "L", and the input B attains "L", so that the open/close operation of the window is not performed. In other words, in this case, the output signal provided by the logic circuit 21 causes all of the FETs 1 to 4 in the drive circuit 22 to turn off, so that the motor M is not driven.

Figure 12:
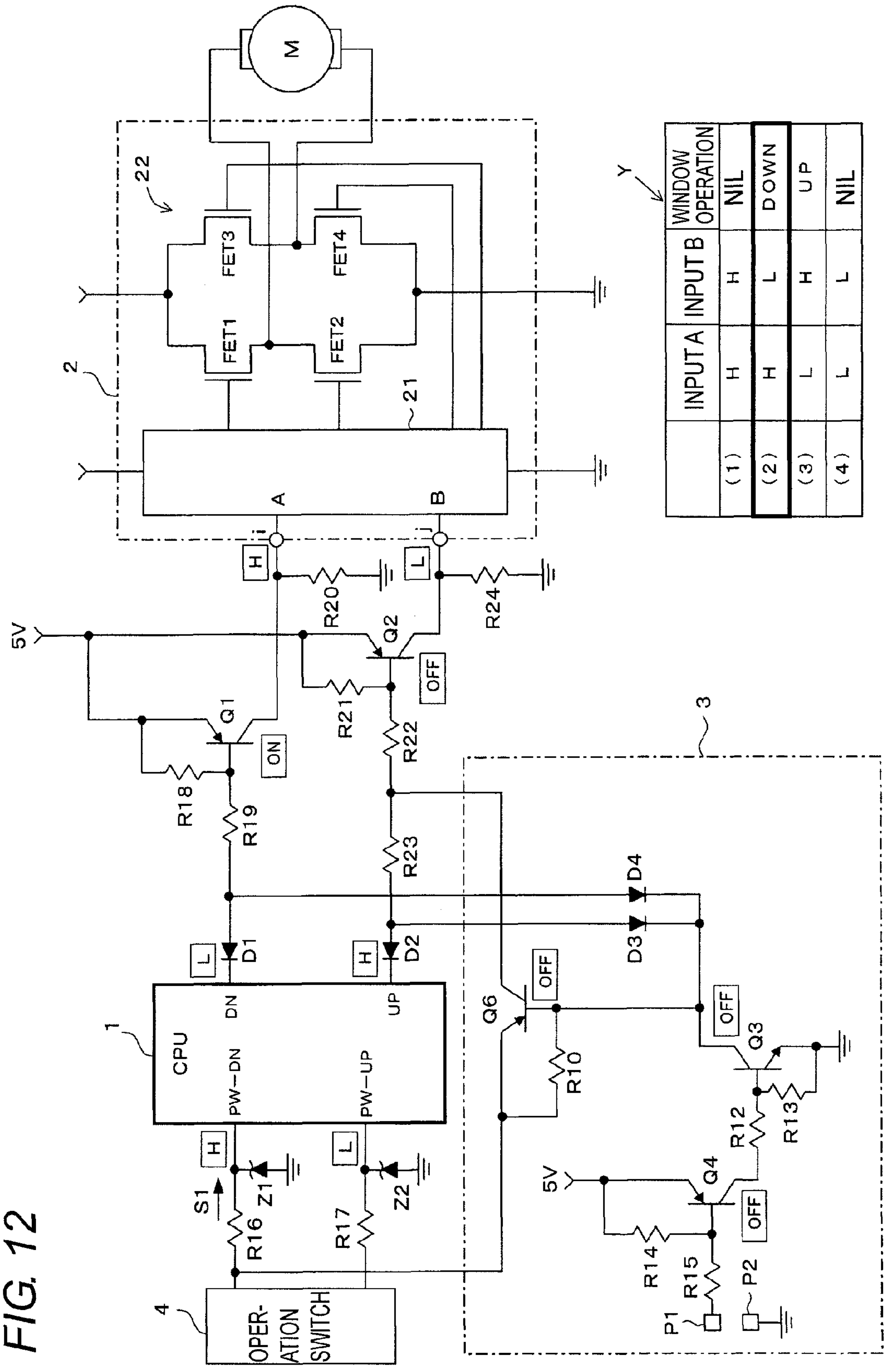
FIG. 12 is a circuit diagram for illustrating operation of the second embodiment in a normal time.

FIG. 12 shows a state of the circuit in the normal time, when the window-open operation is performed with the operation switch 4. In response to the normal rotation instruction S1 provided by the operation switch 4, the window-open signal input terminal (PW-DN) of the CPU 1 attains "H" level. On the other hand, the window-close signal input terminal (PW-UP) is still at "L" level. Accordingly, the window-open signal output terminal (DN) of the CPU 1 attains "L" level, and the window-close signal output terminal (UP) attains "H" level. Meanwhile, in the wetting detection circuit 3, the electrode pads P1 and P2 are not short-circuited by water as in the case of FIG. 11, and accordingly the transistors Q3, Q4, Q6 are OFF state. Therefore, the base of the transistor Q1 attains "L" level, and the transistor Q1 turns on. On the other hand, the base of the transistor Q2 is still at "H" level, and the transistor Q2 maintains OFF state. Since the transistor Q1 is ON state and the transistor Q2 is OFF state, the terminal i of the control circuit 2 attains "H" level, and the terminal j attains "L" level. Therefore, as shown in the row (2) in the table Y, the input A attains "H" and the input B attains "L", and accordingly the window-open operation (DOWN operation) is performed. In other words, in this case, according to the output signal provided by the logic circuit 21, the FET 1 and the FET 4 of the drive circuit 22 turn on, and the FET 2 and FET 3 turn off, so that the motor M is driven in the normal rotation direction, which causes the window to open.

Figure 13:
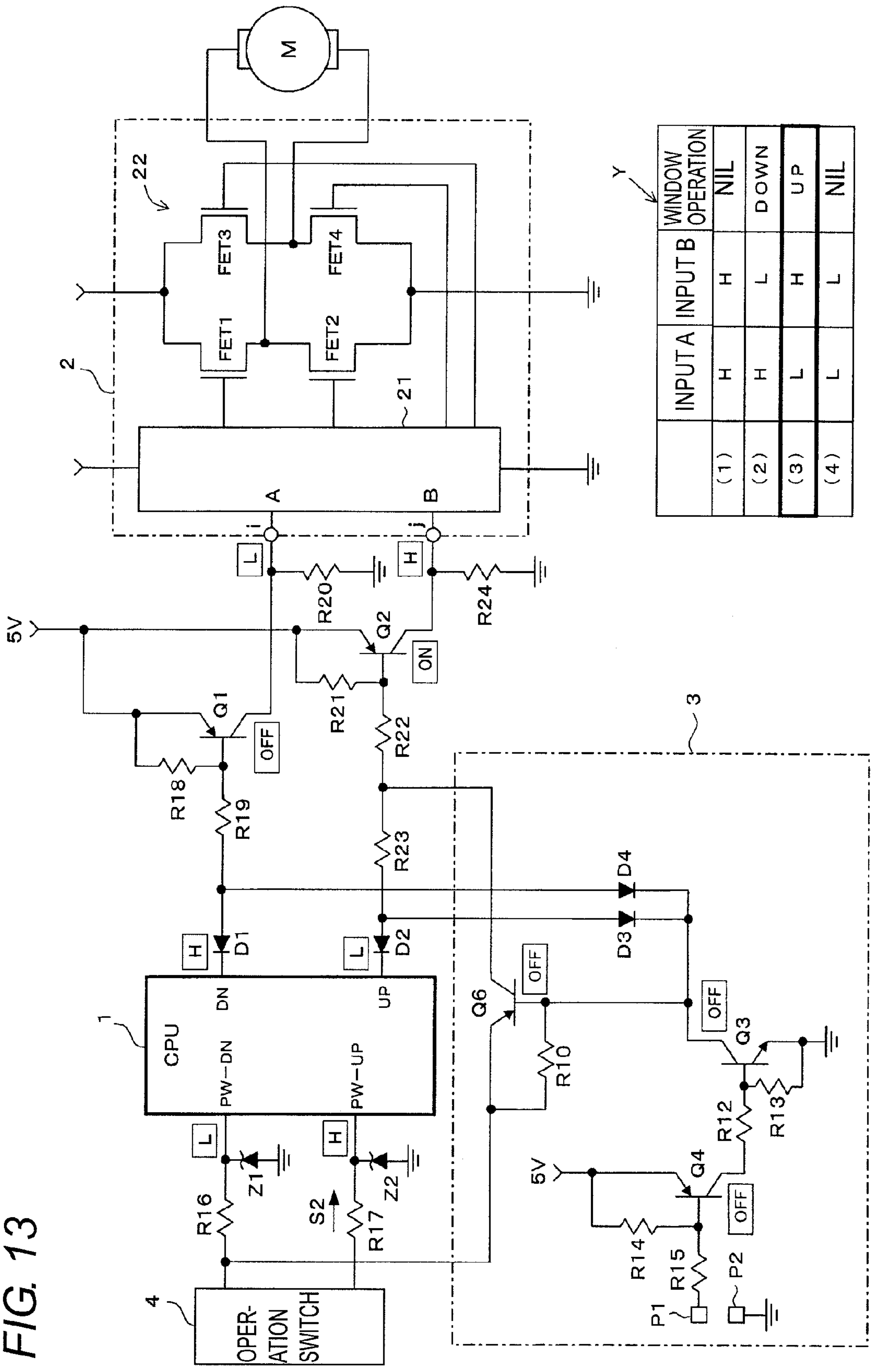
FIG. 13 is a circuit diagram for illustrating operation of the second embodiment in a normal time.

FIG. 13 shows a state of the circuit in the normal time, when the window-close operation is performed with the operation switch 4. In response to the reverse rotation instruction S2 provided by the operation switch 4, the window-close signal input terminal (PW-UP) of the CPU 1 attains "H" level. On the other hand, the window-open signal input terminal (PW-DN) is still at "L" level. Accordingly, the window-open signal output terminal (DN) of the CPU 1 attains "H" level, and the window-close signal output terminal (UP) attains "L" level. Meanwhile, in the wetting detection circuit 3, the electrode pads P1 and P2 are not short-circuited by water as in the case of FIG. 11, and accordingly the transistors Q3, Q4, Q6 are OFF state. Therefore, the base of the transistor Q2 attains "L" level, and the transistor Q2 turns on. On the other hand, the base of the transistor Q1 is still at "H" level, and the transistor Q1 maintains OFF state. Since the transistor Q1 is OFF state and the transistor Q2 is ON state, the terminal i of the control circuit 2 attains "L" level, and the terminal j attains "H" level. Therefore, as shown in the row (3) in the table Y, the input A attains "L" and the input B attains "H", and accordingly the window-close operation (UP operation) is performed. In other words, in this case, according to the output signal provided by the logic circuit 21, the FET 2 and the FET 3 of the drive circuit 22 turn on, and the FET 1 and FET 4 turn off, so that the motor M is driven in the reverse rotation direction, which causes the window to close.

Figure 14:
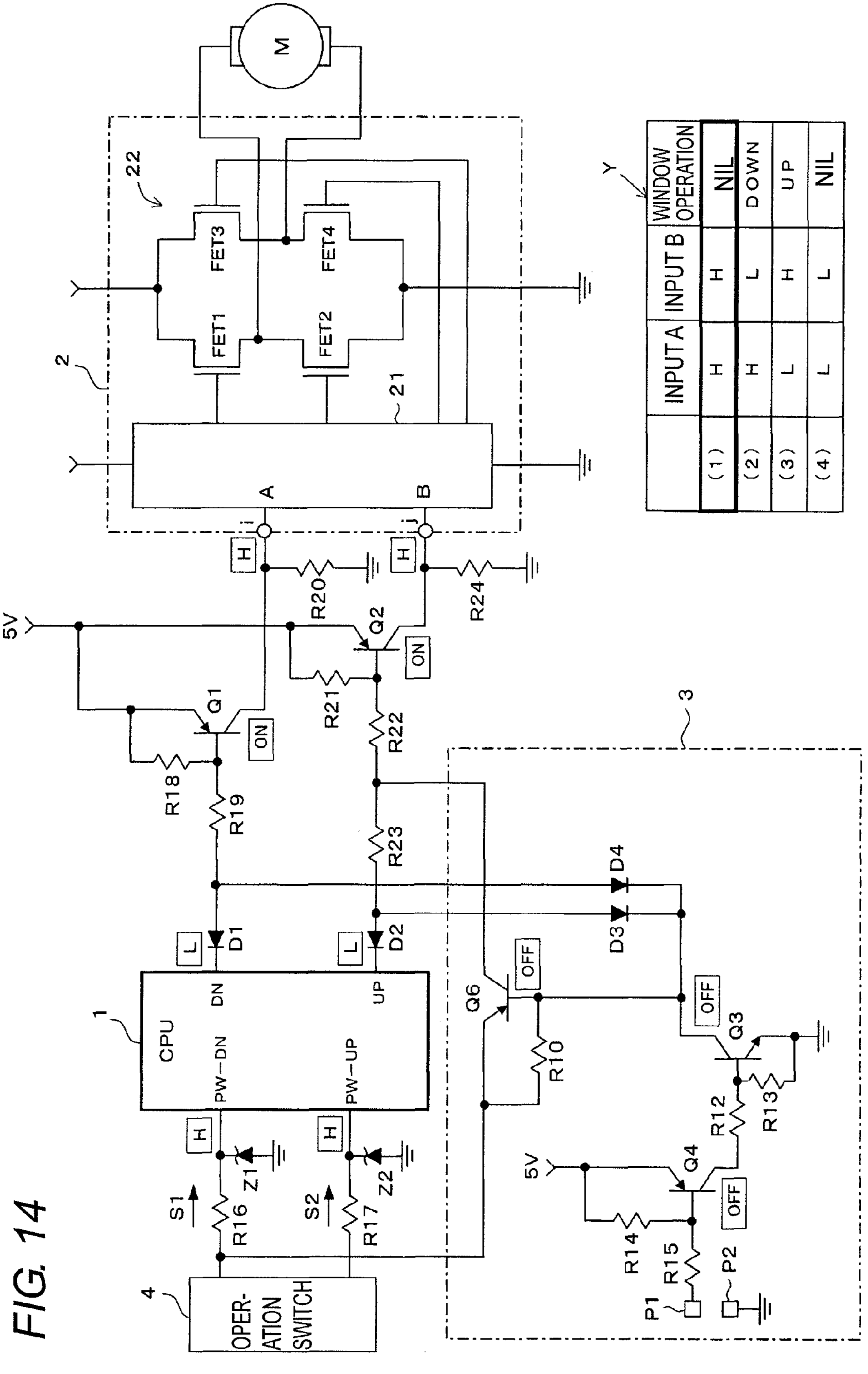
FIG. 14 is a circuit diagram for illustrating operation of the second embodiment in a normal time.

FIG. 14 shows a state of the circuit when the normal rotation instruction S1 and the reverse rotation instruction S2 are inputted from the operation switch 4 at a time. In normal circumstances, both of the instructions are never given at a time, but this may happen when the operation switch 4 breaks down. In this case, both of the window-open signal output terminal (DN) and the window-close signal output terminal (UP) of the CPU 1 attain "L" level, and both of the transistors Q1 and Q2 attain OFF state. Therefore, both of the terminals i and j attain "H" level. Therefore, as shown in the row (1) of the table Y, the input A attains "H" and the input B attains "H", and accordingly the open/close operation of the window is not performed. In other words, in this case, according to the output signal provided by the logic circuit 21, all of the FETs 1 to 4 of the drive circuit 22 turn off, so that the motor M is not driven.

Figure 15:
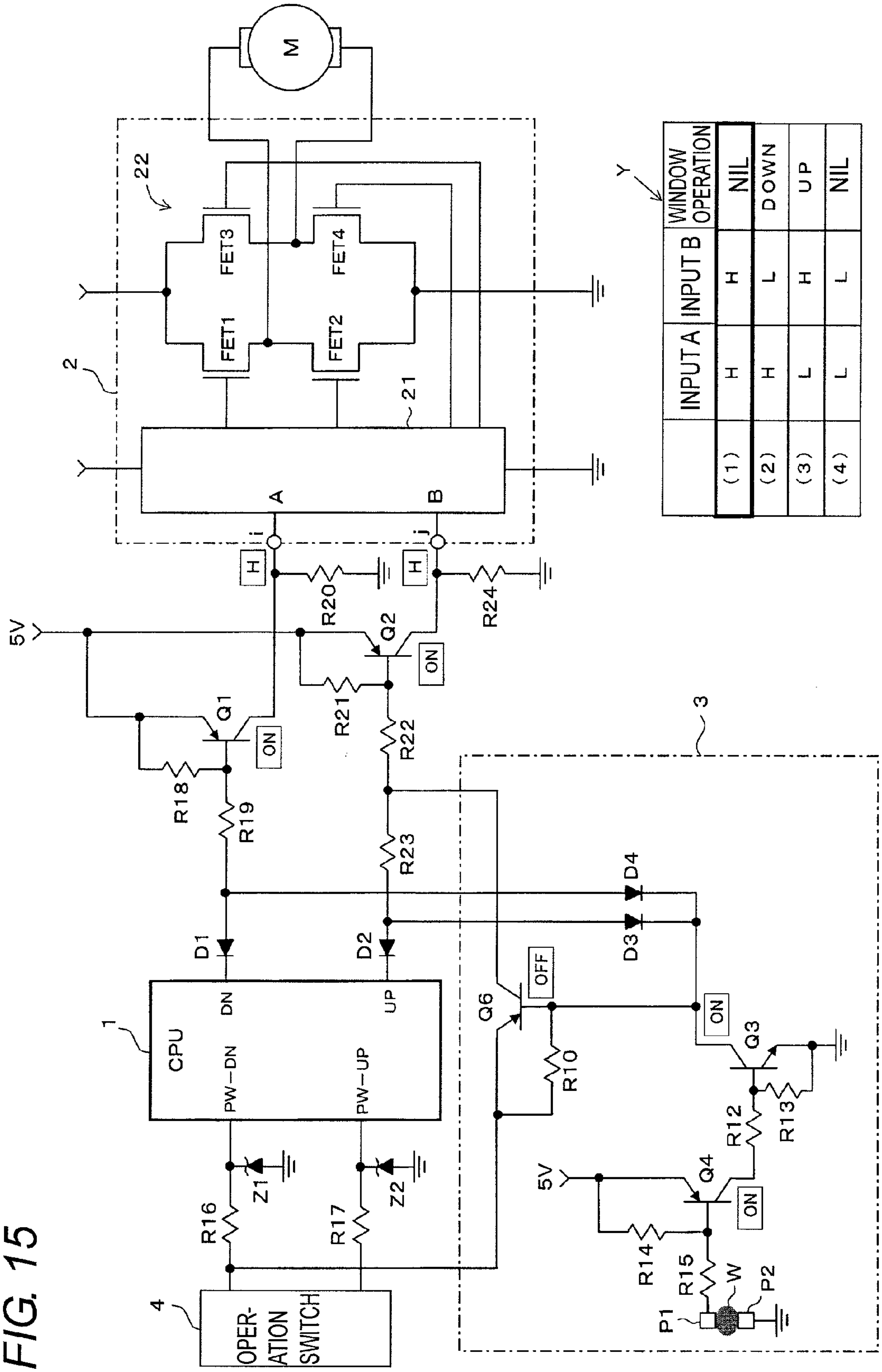
FIG. 15 is a circuit diagram for illustrating operation of the second embodiment during wetting.

FIG. 15 shows a state of the circuit when wetting occurs while the operation switch 4 is not operated. In this case, in the wetting detection circuit 3, the electrode pads P1 and P2 are short-circuited by the water W, and consequently the transistor Q4 turns on. When the transistor Q4 turns on, a current flows between the emitter and collector of this transistor Q4, and this current flows into the base of the transistor Q3, so that the transistor Q3 turns on. Then, when the transistor Q3 turns on, the base of the transistor Q1 attains "L" level. Therefore, regardless of the level of the window-open signal output terminal (DN), the transistor Q1 turns on. Further, when the transistor Q3 turns on, the base of the transistor Q2 attains "L" level by way of the diode D3. Therefore, regardless of the level of the window-close signal output terminal (UP), the transistor Q2 also turns on. When the transistors Q1 and Q2 turn on, both of the terminals i and j attain "H" level. Therefore, when the operation switch 4 is not operated (open-operation described below) while wetting occurs, the input A attains "H" and the input B attains "H" as shown in row (1) of the table Y, so that the open/close operation of the window is not performed.

Figure 16:
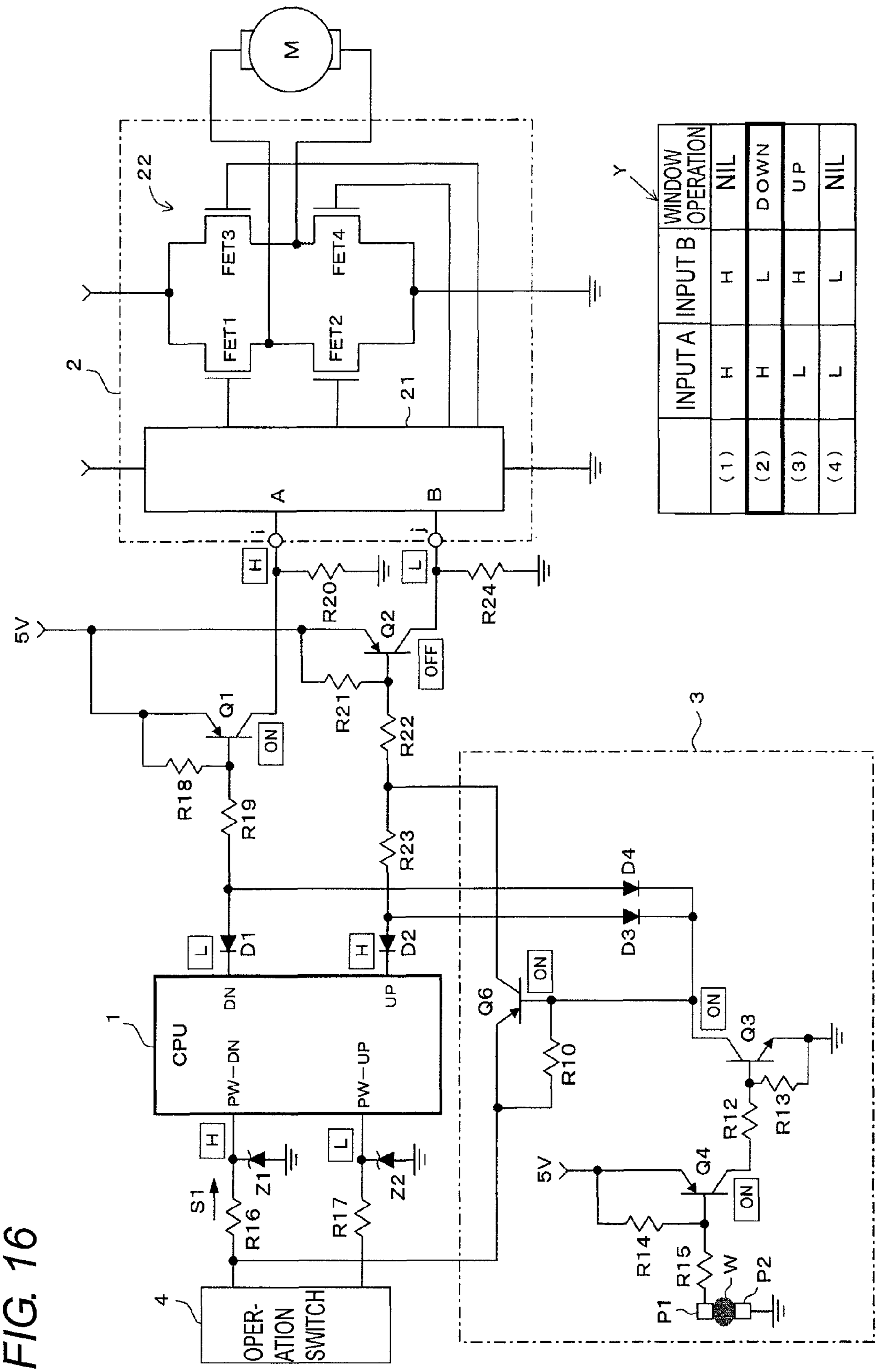
FIG. 16 is a circuit diagram for illustrating operation of the second embodiment during wetting.

Subsequently, when the window-open operation is performed with the operation switch 4 in the state of FIG. 15, the window-open signal input terminal (PW-DN) of the CPU 1 attains "H" level according to the normal rotation instruction S1 as shown in FIG. 16. On the other hand, the window-close signal input terminal (PW-UP) maintains "L" level. Therefore, the window-open signal output terminal (DN) of the CPU 1 attains "L" level, and the window-close signal output terminal (UP) attains "H" level. On the other hand, in the wetting detection circuit 3, the electrode pads P1 and P2 are short-circuited by the water W, which causes the transistors Q3 and Q4 to turn on. Unlike the case of FIG. 15, the transistor Q6 turns on according to the normal rotation instruction S1, so that the potential of the base of the transistor Q2 increases, and the transistor Q2 turns off. On the other hand, the base of the transistor Q1 maintains "L" level, and the transistor Q1 maintains ON state. When the transistor Q1 turns on and the transistor Q2 turns off, the terminal i of the control circuit 2 attains "H" level, and the terminal j attains "L" level. Therefore, as shown in the row (2) in the table Y, the input A attains "H" and the input B attains "L", so that the window-open operation (DOWN operation) is performed. In other words, when the window-open operation is performed with the operation switch 4 during wetting, the motor M is driven in normal rotation direction, so that the window opens.

Figure 17:
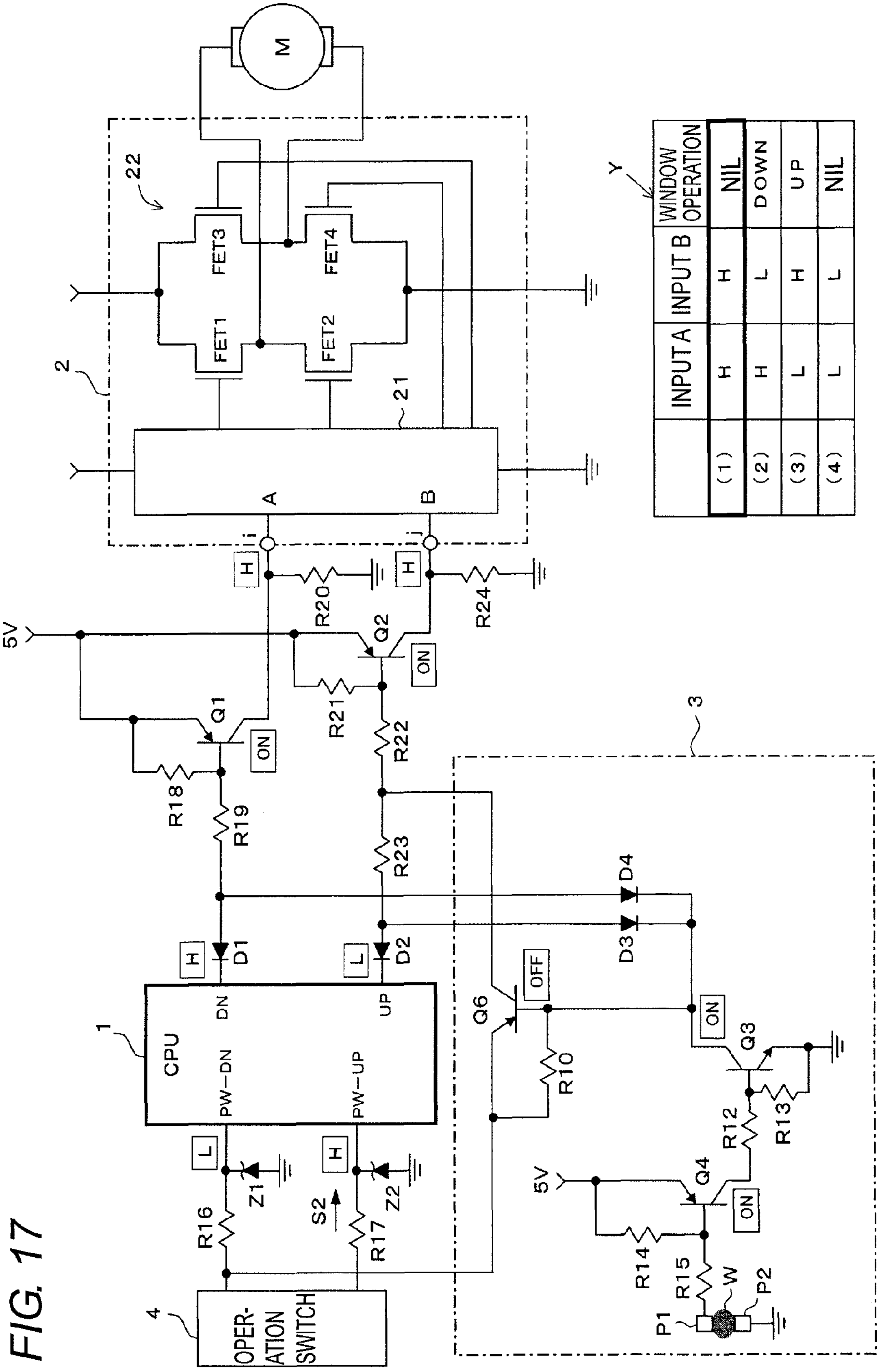
FIG. 17 is a circuit diagram for illustrating operation of the second embodiment during wetting.

On the other hand, the window-close operation is not performed even when the operation switch 4 is operated in order to close the window in the state of FIG. 15. In this case, according to the reverse rotation instruction S2 provided by the operation switch 4, the window-close signal input terminal (PW-UP) of the CPU 1 attains "H" level, and the window-open signal input terminal (PW-DN) attains "L" level, as shown in FIG. 17. Therefore, the window-open signal output terminal (DN) attains "H" level, and the window-close signal output terminal (UP) "L" level. On the other hand, since the transistor Q6 in the wetting detection circuit 3 does not turn on, the base of the transistor Q2 attains "L" level, and accordingly the transistor Q2 turns on. Since the transistor Q3 turns on, the base of the transistor Q1 attains "L" level, and accordingly the transistor Q1 also turns on. Therefore, both of the terminals i and j attain "H" level, and accordingly the input A attains "H" and the input B attains "H" as shown in the row (1) of the table Y, so that the window-close operation is not performed.

Figure 18:
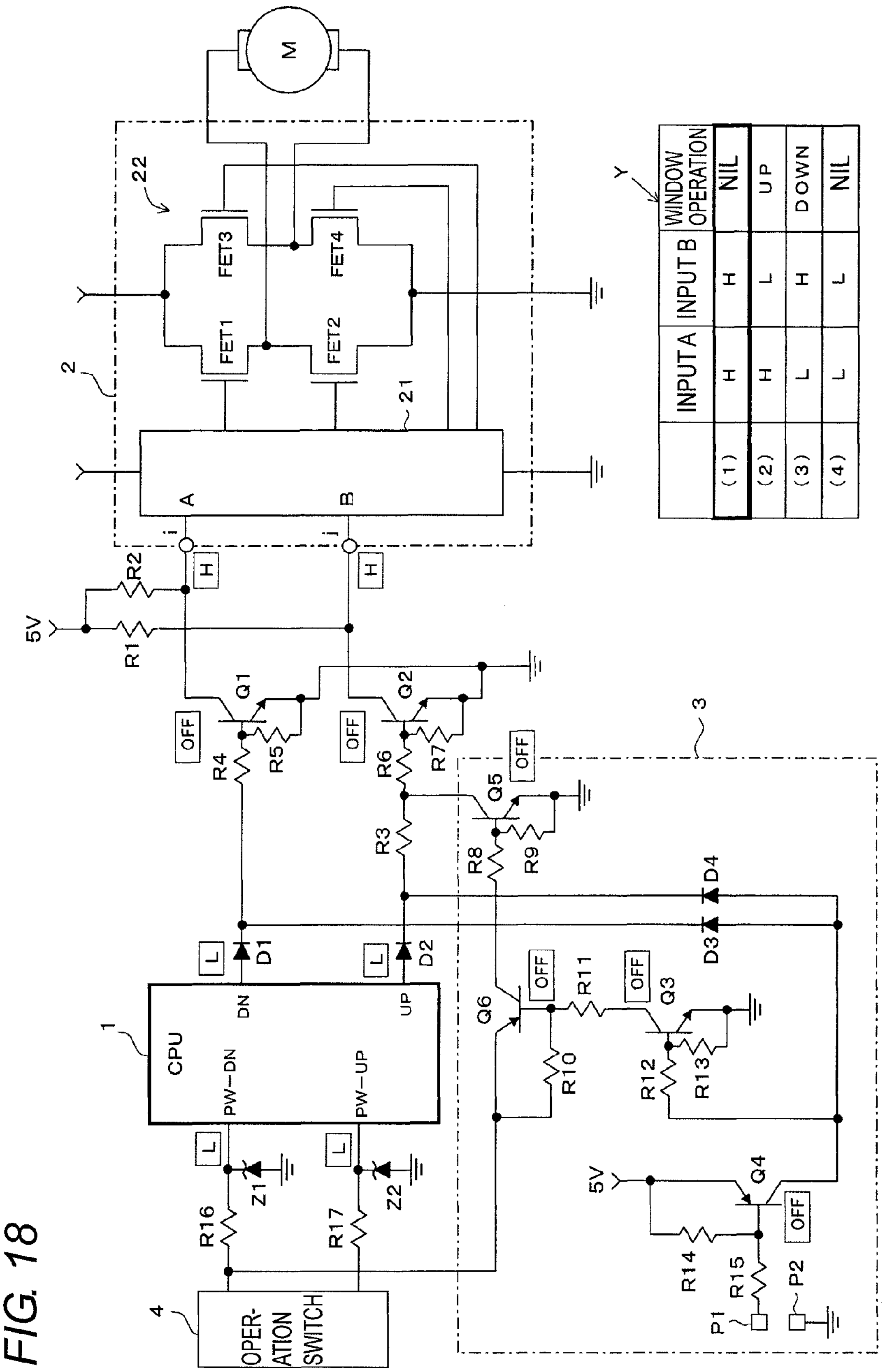
FIG. 18 is a circuit diagram of a motor drive apparatus according to a third embodiment of the present invention.

FIG. 18 is a circuit diagram of the motor drive apparatus (power window apparatus) according to a third embodiment of the present invention. It should be noted that in FIG. 18, the same or corresponding elements as those of FIG. 2 are given the same reference numerals as those of FIG. 2.

The resistor R3 arranged on the side of the base of the transistor Q1 in FIG. 2 is arranged on the side of the base of the transistor Q2 in FIG. 18. The collector of the transistor Q5 arranged on the side of the base of the transistor Q1 in FIG. 2 is arranged on the side of the base of the transistor Q2 in FIG. 18. In the case of FIG. 2, when the operation switch 4 is not manipulated in the normal time, both of the window-open signal output terminal (DN) and the window-close signal output terminal (UP) are "H" level (see FIG. 3). In contrast, in the case of FIG. 18, in the normal time when the operation switch 4 is not operated, both of the window-open signal output terminal (DN) and the window-close signal output terminal (UP) attain "L" level. Further, the logic in the table Y is different from the case of FIG. 2. The operation of the circuit of FIG. 18 can be easily derived from the operation of the circuit of FIG. 2, and therefore, the operation will be only briefly described.

When the operation switch 4 is not operated in the normal time, both of the window-open signal output terminal (DN) and the window-close signal output terminal (UP) are "L" level as shown in FIG. 18, and all the transistors Q3 to Q6 in the wetting detection circuit 3 are OFF state. Accordingly, the transistors Q1 and Q2 are OFF state, and both of the terminals i and j of the control circuit 2 attain "H" level. Therefore, as shown in the row (1) in the table Y, the input A attains "H" and the input B attains "H", so that the open/close operation of the window is not performed.

When the window-open operation is performed with the operation switch 4, the window-open signal output terminal (DN) of the CPU 1 attains "H" level according to the normal rotation instruction, and the transistor Q1 turns on. The transistor Q2 is still OFF state. Therefore, the terminal i of the control circuit 2 attains "L" level, and the terminal j attains "H" level. Therefore, as shown in the row (3) in the table Y, the input A attains "L" and the input B attains "H", so that the window-open operation (DOWN operation) is performed.

When the window-close operation is performed with the operation switch 4, the window-close signal output terminal (UP) of the CPU 1 attains "H" level according to the reverse rotation instruction, and the transistor Q2 turns on. The transistor Q1 is still OFF state. Accordingly, the terminal i of the control circuit 2 attains "H" level, and the terminal j attains "L" level. Therefore, as shown in the row (2) in the table Y, the input A attains "H", and the input B attains "L", so that the window-close operation (UP operation) is performed.

When the normal rotation instruction and the reverse rotation instruction are inputted at a time due to breakdown of the operation switch 4, both of the window-open signal output terminal (DN) and the window-close signal output terminal (UP) of the CPU 1 attain "H" level, and the transistors Q1 and Q2 turn on. As a result, both of the terminals i and j of the control circuit 2 attain "L" level. Therefore, as shown in the row (4) in the table Y, the input A attains "L", and the input B attains "L", so that the open/close operation of the window is not performed.

Figure 19:
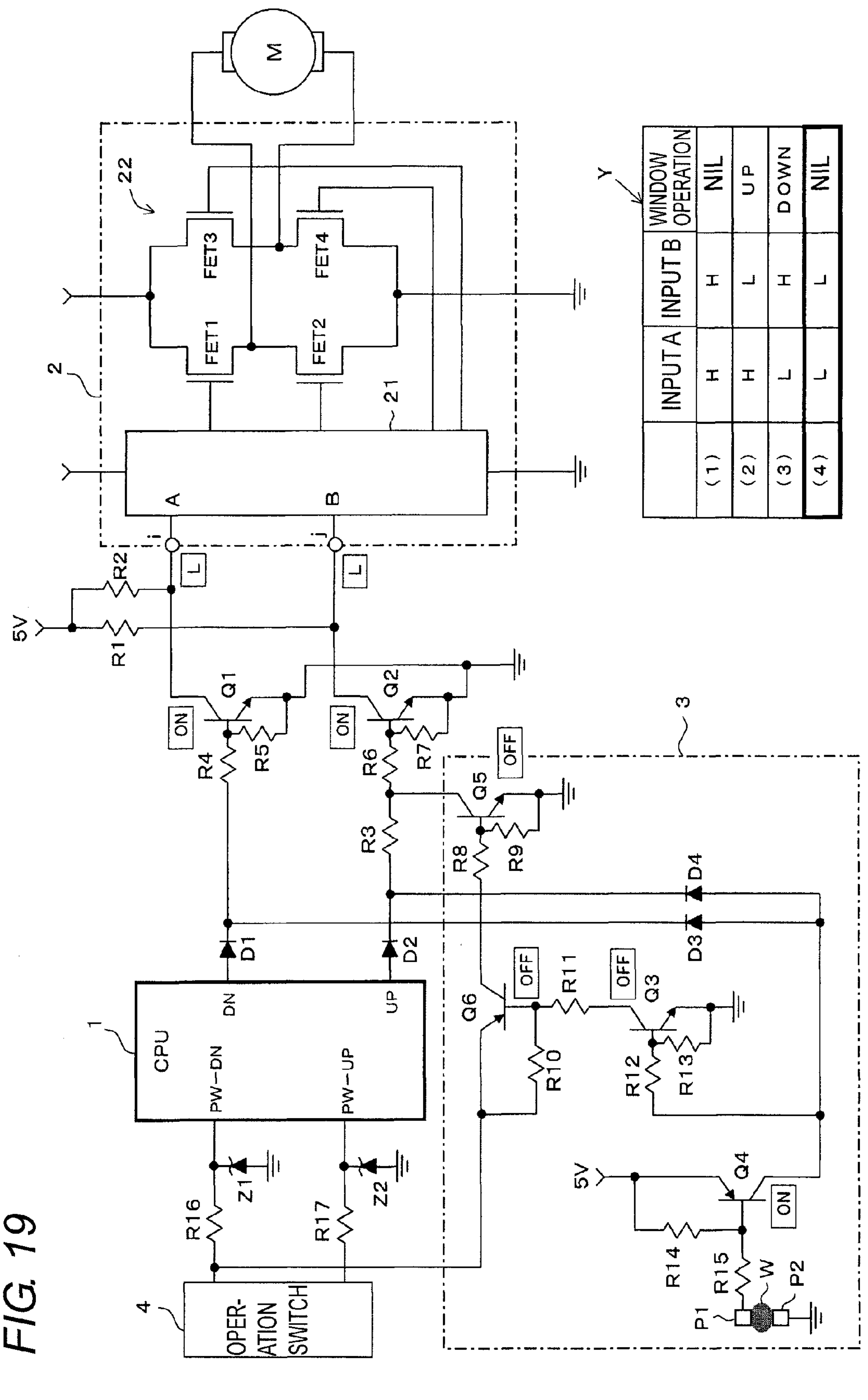
FIG. 19 is a circuit diagram for illustrating operation of the third embodiment during wetting.

When wetting occurs while the operation switch 4 is not operated, the electrode pads P1 and P2 in the wetting detection circuit 3 are short-circuited by the water W as shown in FIG. 19. As a result, the transistor Q4 turns on, and accordingly, both of the transistors Q1 and Q2 turn on. As a result, both of the terminals i and j of the control circuit 2 attain "L" level. Therefore, as shown in the row (4) in the table Y, the input A attains "L", and the input B attains "L", so that the open/close operation of the window is not performed.

Figure 20:
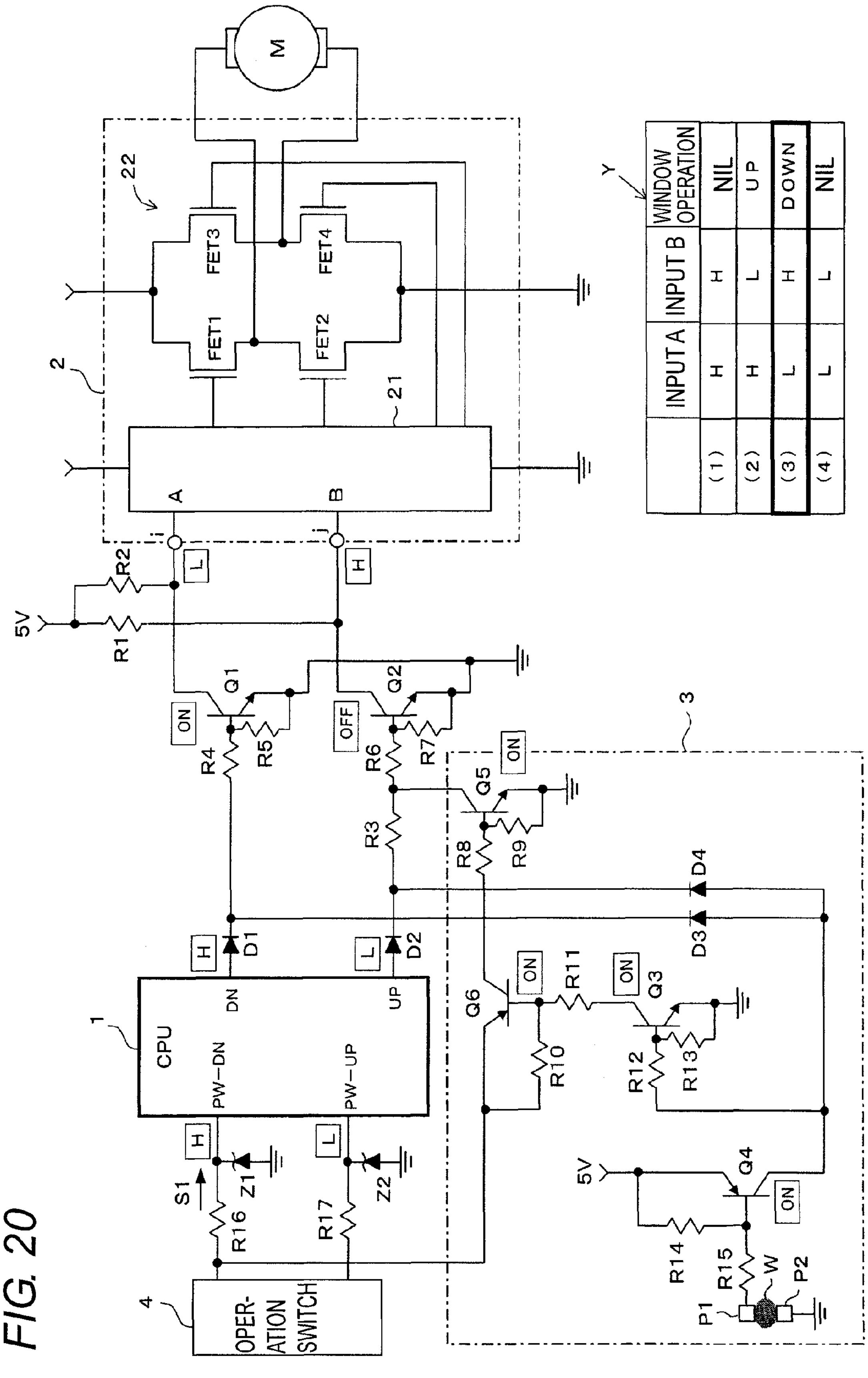
FIG. 20 is a circuit diagram for illustrating operation of the third embodiment during wetting.

Subsequently, when the window-open operation is performed with the operation switch 4 in the state of FIG. 19, the window-open signal output terminal (DN) of the CPU 1 attains "H" level according to the normal rotation instruction S1 as shown in FIG. 20. On the other hand, in the wetting detection circuit 3, all of the transistors Q3 to Q6 turn on, and the transistor Q5 turns on, so that the transistor Q2 turns off. On the other hand, because the base of the transistor Q1 is "H" level, the transistor Q1 turns on. As a result, the terminal i of the control circuit 2 attains "L" level, and the terminal j attains "H" level. Therefore, as shown in the row (3) in the table Y, the input A attains "L", and the input B attains "H", so that the window-open operation (DOWN operation) is performed. In other words, when the window-open operation is performed with the operation switch 4 during wetting, the motor M is driven in the normal rotation direction, so that the window opens.

On the other hand, even if the close operation is performed with the operation switch 4 in the state of FIG. 19, the window-close operation is not performed. In this case, the window-close signal output terminal (UP) of the CPU 1 attains "H" level according to the reverse rotation instruction. On the other hand, the transistor Q6 of the wetting detection circuit 3 does not turn on, and the transistor Q5 is OFF state, which causes the transistor Q2 to turn on. Further, since the base of the transistor Q1 is provided with a current from the transistor Q4 via the diode D3, the transistor Q1 also turns on. Accordingly, both of the terminals i and j attain "L" level. Therefore, as shown in the row (4) in the table Y, the input A attains "L", and the input B attains "L", so that the window-close operation is not performed.

Figure 21:
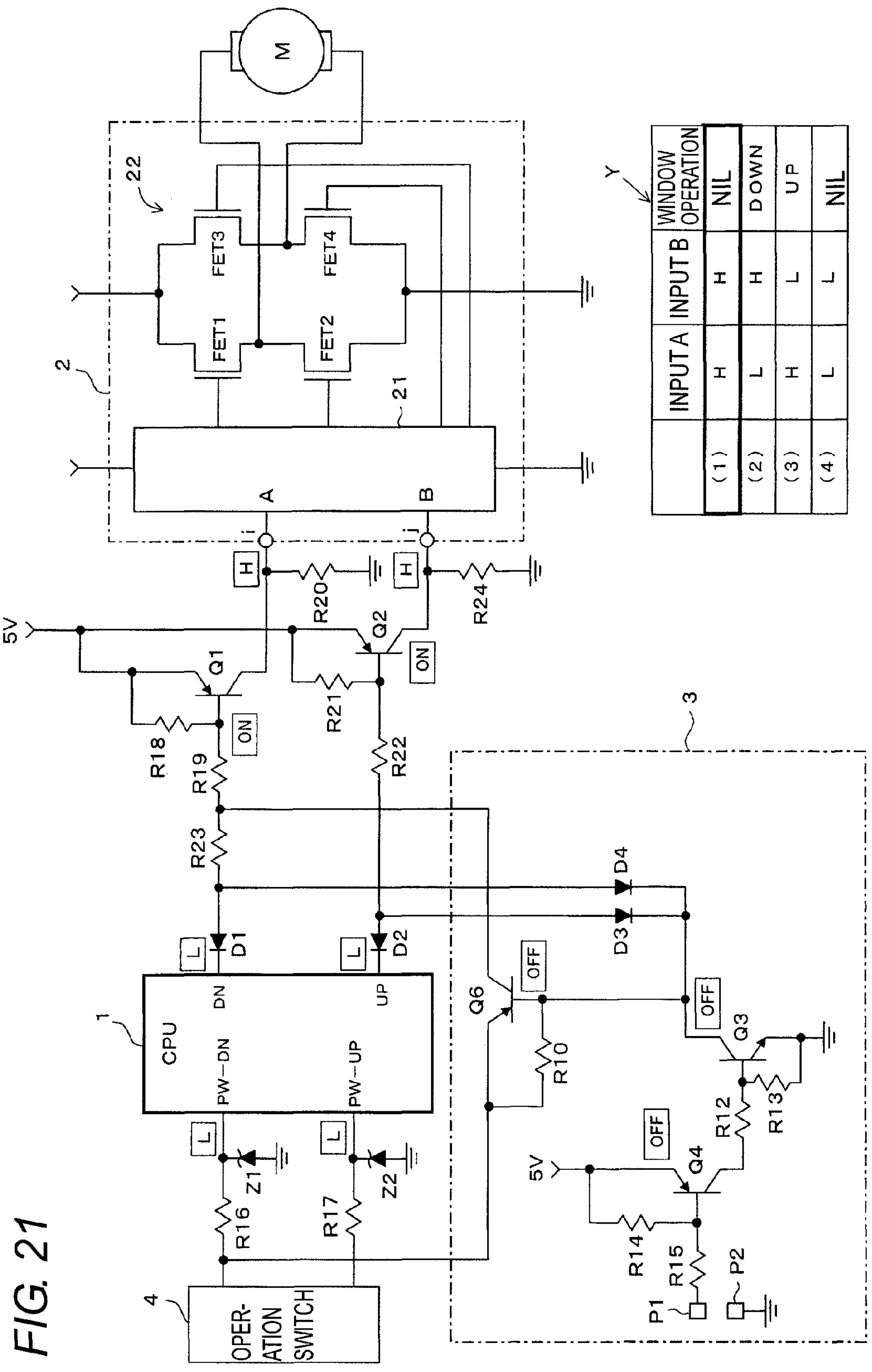
FIG. 21 is a circuit diagram of a motor drive apparatus according to a fourth embodiment of the present invention.

FIG. 21 is a circuit diagram of a motor drive apparatus (power window apparatus) according to a fourth embodiment of the present invention. It should be noted that in FIG. 21, the same or corresponding elements as those of FIG. 10 are given the same reference numerals as those of FIG. 10.

The resistor R23 arranged on the side of the base of the transistor Q2 in FIG. 10 is arranged on the side of the base of the transistor Q1 in FIG. 21. The collector of the transistor Q6 arranged on the side of the base of the transistor Q2 in FIG. 10 is arranged on the side of the base of the transistor Q1 in FIG. 21. In the case of FIG. 10, when the operation switch 4 is not operated in the normal time, both of the window-open signal output terminal (DN) and the window-close signal output terminal (UP) are "H" level (see FIG. 11). In contrast, in the case of FIG. 21, when the operation switch 4 is not operated in the normal time, both of the window-open signal output terminal (DN) and the window-close signal output terminal (UP) attain "L" level. Further, the logic in the table Y is different from the case of FIG. 10. The operation of the circuit of FIG. 21 can be easily derived from the operation of the circuit of FIG. 10, and therefore, the operation will be only briefly described.

When the operation switch 4 is not operated in the normal time, both of the window-open signal output terminal (DN) and the window-close signal output terminal (UP) are "L" level as shown in FIG. 21, and the transistors Q3, Q4, Q6 in the wetting detection circuit 3 are OFF state. Accordingly, the transistors Q1 and Q2 attain ON state, and both of the terminals i and j of the control circuit 2 attain "H" level. Therefore, as shown in the row (1) in the table Y, the input A attains "H" and the input B attains "H", so that the open/close operation of the window is not performed.

When the window-open operation is performed with the operation switch 4, the window-open signal output terminal (DN) of the CPU 1 attains "H" level according to the normal rotation instruction, and the transistor Q1 turns off. The transistor Q2 is still ON state. Therefore, the terminal i of the control circuit 2 attains "L" level, and the terminal j attains "H" level. Therefore, as shown in the row (2) in the table Y, the input A attains "L" and the input B attains "H", so that the window-open operation (DOWN operation) is performed.

When the window-close operation is performed with the operation switch 4, the window-close signal output terminal (UP) of the CPU 1 attains "H" level according to the reverse rotation instruction, and the transistor Q2 turns off. The transistor Q1 is still ON state. Accordingly, the terminal i of the control circuit 2 attains "H" level, and the terminal j attains "L" level. Therefore, as shown in the row (3) in the table Y, the input A attains "H", and the input B attains "L", so that the window-close operation (UP operation) is performed.

When the normal rotation instruction and the reverse rotation instruction are inputted at a time due to breakdown of the operation switch 4, both of the window-open signal output terminal (DN) and the window-close signal output terminal (UP) of the CPU 1 attain "H" level, and the transistors Q1 and Q2 turn off. As a result, both of the terminals i and j of the control circuit 2 attain "L" level. Therefore, as shown in the row (4) in the table Y, the input A attains "L", and the input B attains "L", so that the open/close operation of the window is not performed.

Figure 22:
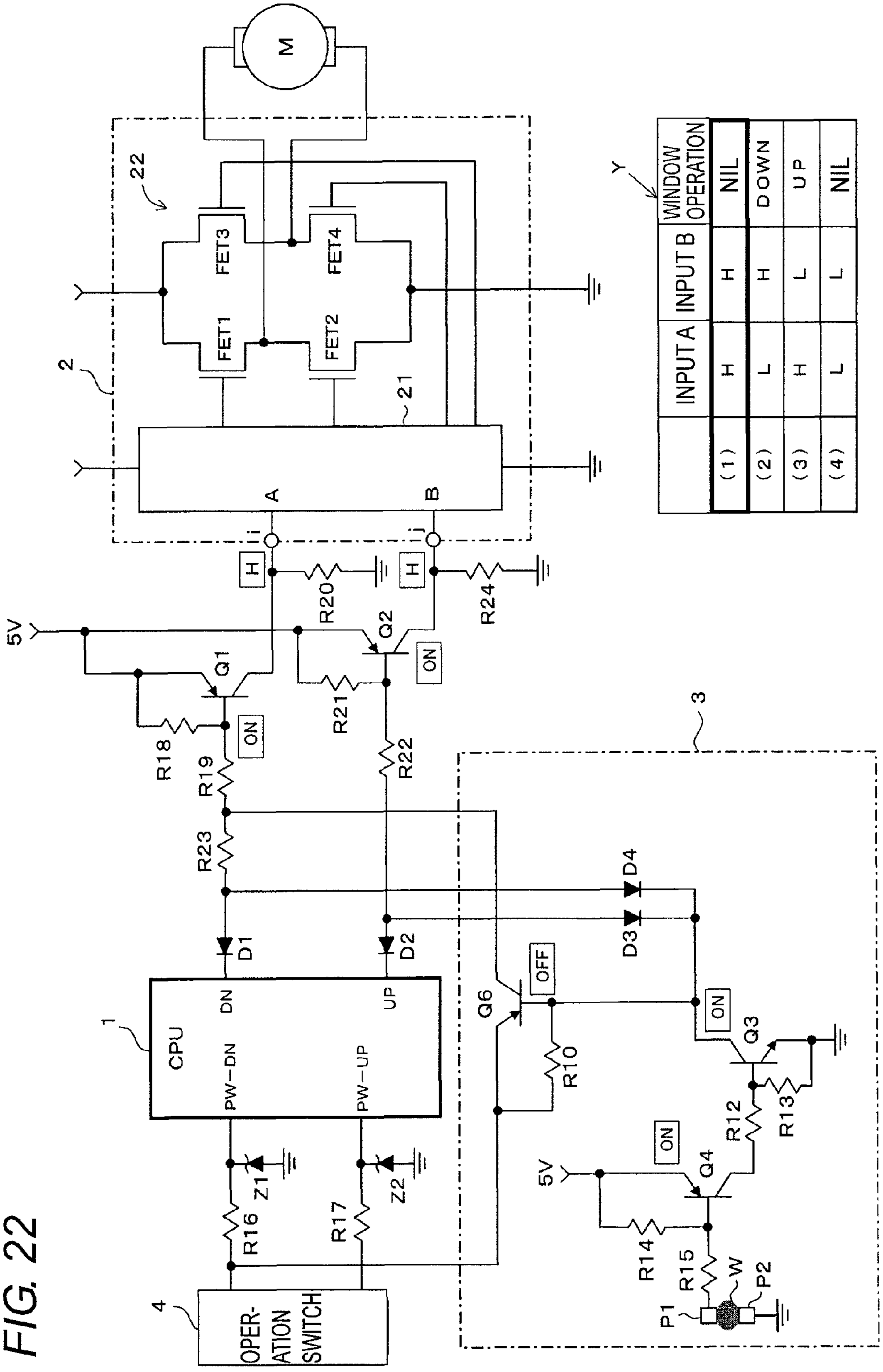
FIG. 22 is a circuit diagram for illustrating operation of the fourth embodiment during wetting.

When wetting occurs while the operation switch 4 is not operated, the electrode pads P1 and P2 in the wetting detection circuit 3 are short-circuited by the water W as shown in FIG. 22. As a result, the transistors Q4 and Q3 turn on, and accordingly, both of the transistors Q1 and Q2 turn on. As a result, both of the terminals i and j of the control circuit 2 attain "H" level. Therefore, as shown in the row (1) in the table Y, the input A attains "H", and the input B attains "H", so that the open/close operation of the window is not performed.

Figure 23:
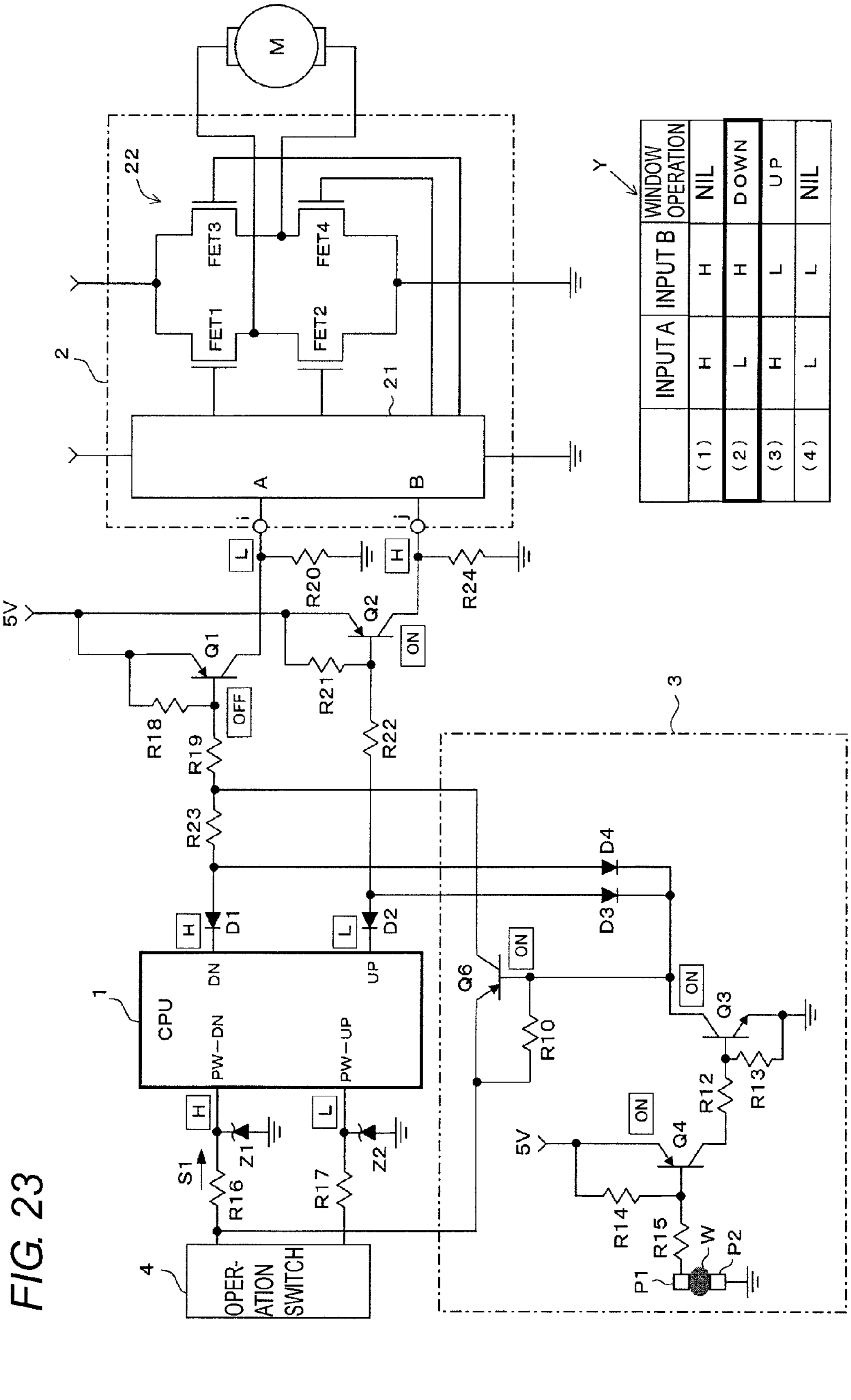
FIG. 23 is a circuit diagram for illustrating operation of the fourth embodiment during wetting.

Subsequently, when the window-open operation is performed with the operation switch 4 in the state of FIG. 22, the window-open signal output terminal (DN) of the CPU 1 attains "H" level according to the normal rotation instruction S1 as shown in FIG. 23. On the other hand, in the wetting detection circuit 3, all of the transistors Q3, Q4, Q6 turn on, and the transistor Q6 turns on. Accordingly, the potential of the base of the transistor Q1 increases, and the transistor Q1 turns off. On the other hand, since the potential of the base of the transistor Q2 does not change, the transistor Q2 maintains ON state. As a result, the terminal i of the control circuit 2 attains "L" level, and the terminal j attains "H" level. Therefore, as shown in the row (2) in the table Y, the input A attains "L", and the input B attains "H", so that the window-open operation (DOWN operation) is performed. In other words, when the window-open operation is performed with the operation switch 4 during wetting, the motor M is driven in the normal rotation direction, so that the window opens.

On the other hand, even if the close operation is performed with the operation switch 4 in the state of FIG. 22, the window-close operation is not performed. In this case, the window-close signal output terminal (UP) of the CPU 1 attains "H" level according to the reverse rotation instruction. However, since the transistor Q3 of the wetting detection circuit 3 is ON state, the base of the transistor Q2 is "L" level, and the transistor Q2 maintains ON state. Further, since the transistor Q6 of the wetting detection circuit 3 does not turn on, the base of the transistor Q1 is "L" level, and the transistor Q1 maintains ON state. Accordingly, both of the terminals i and j attain "H" level. Therefore, as shown in the row (1) in the table Y, the input A attains "H", and the input B attains "H", so that the window-close operation is not performed.

Figure 24:
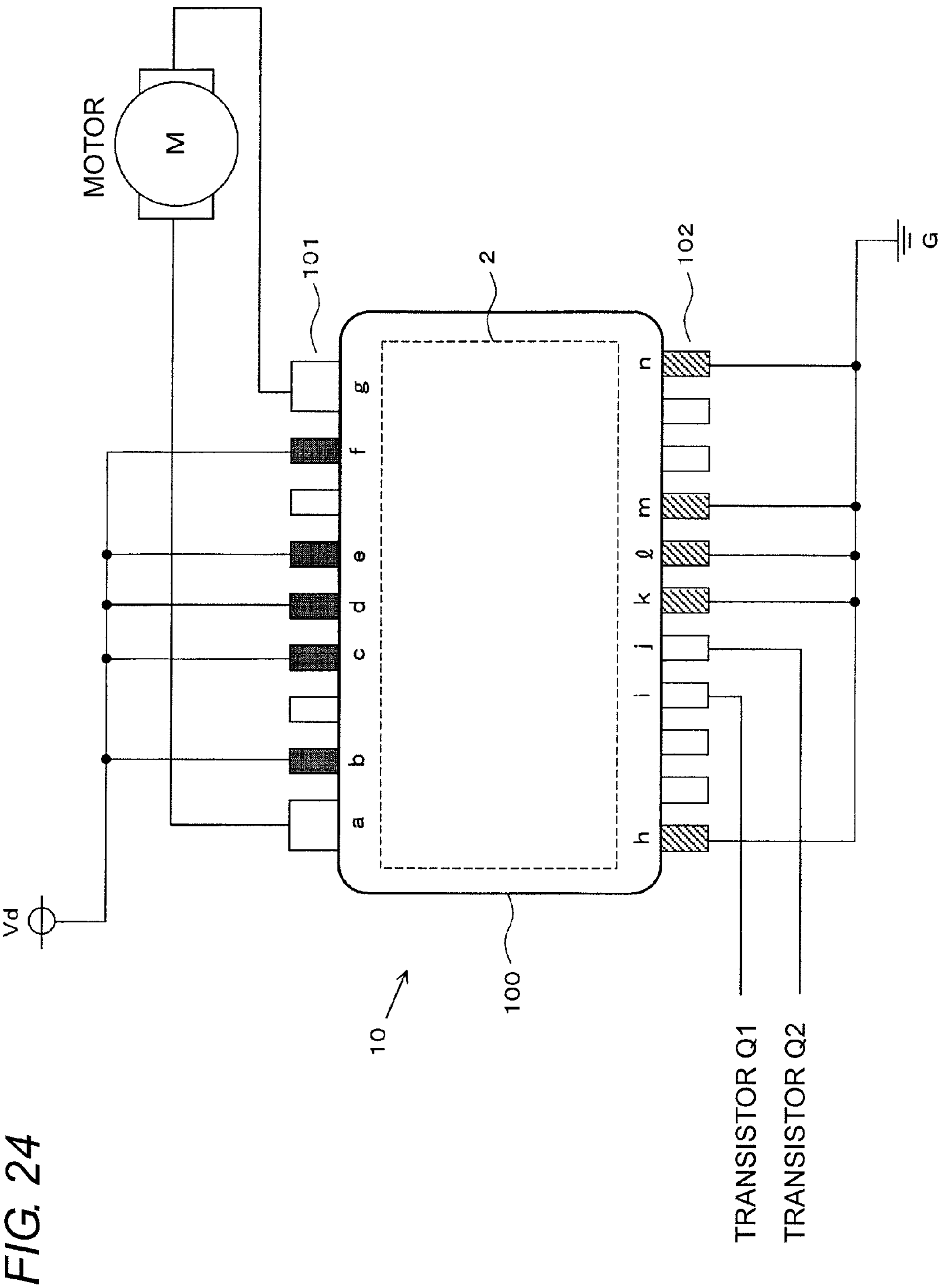
FIG. 24 is a plan view of an IC used in the first and third embodiments.

FIG. 24 is a plan view of an IC used in the control circuit 2 according to the first embodiment (FIG. 2) and the third embodiment (FIG. 18). The IC 10 includes a package 100 containing the control circuit 2, a first terminal group 101 arranged on one side of the package 100, and a second terminal group 102 arranged on the other side of the package 100.

In the first terminal group 101, terminals a and g are connected to the motor M, and the terminals b, c, d, e, f are connected to the power supply Vd. In the second terminal group 102, the terminal i is connected to the collector of the transistor Q1, and the terminal j is connected to the collector of the transistor Q2 (see FIG. 2 and FIG. 18). Terminals h, k, l, m, n are connected to a ground G.

The terminals b, c, d, e, f connected to the power supply Vd are high level terminals. Signals having voltage values (in this example, a voltage 5V) higher than the reference voltage value (predetermined voltage value between the voltage value of the power supply Vd and the voltage value of the ground G) are inputted to the terminals b, c, d, e, f. The terminals h, k, l, m, n connected to the ground G are low level terminals. Signals having voltage values (in this example, a voltage 0V) lower than the reference voltage value are inputted to the terminals h, k, l, m, n.

Meanwhile, in the IC 10 of FIG. 24, the terminals i and j connected to the transistors Q1 and Q2 are separated from the high level terminals b, c, d, e, f, and are arranged in proximity to the low level terminals h, k, l, m, n. Therefore, if this IC 10 is employed in the second embodiment and the fourth embodiment, and when wetting occurs, both of the terminals i and j attain "H" level (voltage value higher than the reference voltage value) (see FIG. 15 and FIG. 22), and accordingly voltage differences between the terminals i and j and the low level terminals h, k, l, m, n are large during wetting in these embodiments. Therefore, the terminals may be short-circuited by water, and the control circuit 2 may malfunction.

In contrast, if the IC 10 of FIG. 24 is employed in the first embodiment and the third embodiment, and when wetting occurs, both of the terminals i and j attain "L" level (voltage value lower than the reference voltage value) (see FIG. 7 and FIG. 19), and accordingly, in these embodiments, voltage differences between the terminals i and j and the low level terminals h, k, l, m, n are zero or very small even if at all. Therefore, the terminals can be prevented from being short-circuited by water. Even if they are short circuited, the inputs of "H" and "L" to the IC 10 are hardly affected, and therefore, the IC 10 does not malfunction.

In other words, when the IC 10 having the terminals i and j arranged in proximity to the low level terminals h, k, l, m, n as shown in FIG. 24 is used, the circuit configuration may be configured such that the terminals i and j attain "L" level when the normal rotation instruction S1 is not given with the operation switch 4 during wetting, as in the first embodiment and the third embodiment. With this configuration, the terminals can be effectively prevented from being short-circuited during wetting.

In FIG. 24, the terminals a, g connected to the motor M have relatively high voltages, and therefore, the terminals a, g are arranged in proximity to the high level terminals b, c, d, e, f.

Figure 25:
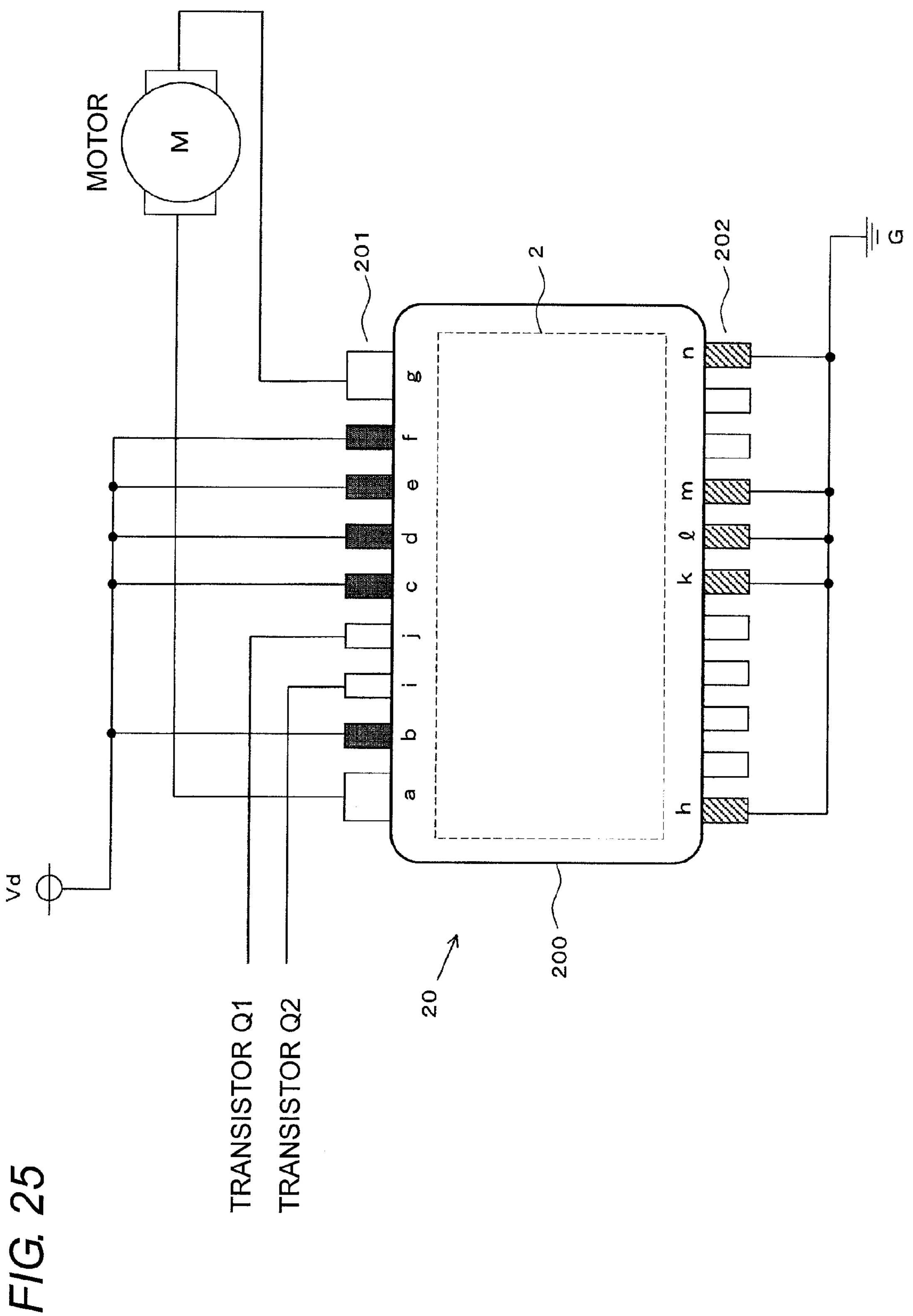
FIG. 25 is a plan view of an IC used in the second and fourth embodiments.

FIG. 25 is a plan view showing an IC used in the control circuit 2 according to the second embodiment (FIG. 10) and the fourth embodiment (FIG. 21). The IC 20 includes a package 200 containing the control circuit 2, a first terminal group 201 arranged on one side of the package 200, and a second terminal group 202 arranged on the other side of the package 200.

In the first terminal group 201, terminals a and g are connected to the motor M, and the terminals b, c, d, e, f are connected to the power supply Vd. The terminal i is connected to the collector of the transistor Q1, and the terminal j is connected to the collector of the transistor Q2 (see FIG. 10 and FIG. 21). In the second terminal group 202, terminals h, k, l, m, n are connected to the ground G.

The terminals b, c, d, e, f connected to the power supply Vd are high level terminals. Signals having voltage values (in this example, a voltage 5V) higher than the reference voltage value are inputted to the terminals b, c, d, e, f. The terminals h, k, l, m, n connected to the ground G are low level terminals. Signals having voltage values (in this example, a voltage 0V) lower than the reference voltage value are inputted to the terminals h, k, l, m, n.

Meanwhile, in the IC 20 of FIG. 25, the terminals i and j connected to the transistors Q1 and Q2 are separated from the low level terminals h, k, l, m, n, and are arranged in proximity to the high level terminals b, c, d, e, f. Therefore, if this IC 20 is employed in the first embodiment and the third embodiment, and when wetting occurs, both of the terminals i and j attain "L" level (voltage value lower than the reference voltage value) (see FIG. 7 and FIG. 19), and accordingly voltage differences between the terminals i and j and the high level terminals b, c, d, e, f are large during wetting in these embodiments. Therefore, the terminals may be short-circuited by water, and the control circuit 2 may malfunction.

In contrast, if the IC 20 of FIG. 25 is employed in the second embodiment and the fourth embodiment, and when wetting occurs, both of the terminals i and j attain "H" level (voltage value higher than the reference voltage value) (see FIG. 15 and FIG. 22), and accordingly, in these embodiments, voltage differences between the terminals i and j and the high level terminals b, c, d, e, f are zero or very small even if at all. Therefore, the terminals can be prevented from being short-circuited by water. Even if they are short circuited, the inputs of "H" and "L" to the 2C 10 are hardly affected, and therefore, the IC 20 does not malfunction.

In other words, when the IC 20 having the terminals i and j arranged in proximity to the high level terminals b, c, d, e, f as shown in FIG. 25 is used, the circuit configuration may be configured such that the terminals i and j attain "H" level when the normal rotation instruction S1 is not given with the operation switch 4 during wetting, as in the second embodiment and the fourth embodiments. With this configuration, the terminals can be effectively prevented from being short-circuited during wetting.

In FIG. 25, the terminals a, g connected to the motor M have relatively high voltages, and therefore, the terminals a, g are arranged in proximity to the high level terminals b, c, d, e, f.

As described above, when the IC 10 of FIG. 24 is used, the terminals i and j, which attain "L" level during wetting, are arranged in proximity to the low level terminals h, k, l, m, n. Therefore, when the voltage difference between the terminals becomes small, and the IC 10 is less likely to malfunction due to the short-circuited terminals during wetting. Further, when the IC 20 of FIG. 25 is used, the terminals i and j, which attain "H" level during wetting, are arranged in proximity to the high level terminals b, c, d, e, f. Therefore, when the voltage difference between the terminals becomes small, and the IC 20 is less likely to malfunction due to the short-circuited terminals during wetting.

Further, according to the arrangement of the terminals in the used IC, the input side circuit of the IC are arranged such that the voltage of the terminals i and j attains "H" level or "L" level during wetting. With such arrangement of the input side circuit of the IC, the terminals can be prevented from being short-circuited during wetting, regardless of whether the used IC is the IC 10 of FIG. 24 or IC 20 of FIG. 25.

Further, the low level terminals h, k, l, m, n are arranged on one side of the package 100, 200, and the high level terminals b, c, d, e, f are arranged on the other side of the package 100, 200. Therefore, the terminals i and j are reliably separated from the high level terminal or the low level terminal. As a result, it is possible to effectively prevent malfunction of the ICs 10 and 20 due to the short-circuited terminals during wetting.

In the first embodiment and the third embodiment, the terminals i and j attain "L" level during wetting. Even if there is a ground line in proximity to signal lines connected to the terminals i and j on a circuit board (omitted from the figure) implemented with the IC 10, these lines can be prevented from being short-circuited. On the other hand, in the second embodiment and the fourth embodiment, the terminals i and j attain "H" level during wetting, which may be considered to be inferior to the first and third embodiments in terms of prevention of short-circuit between the lines, but results in a simple circuit configuration because the wetting detection circuit 3 can be made with only three transistors (Q3, Q4, Q6).

Figure 26:
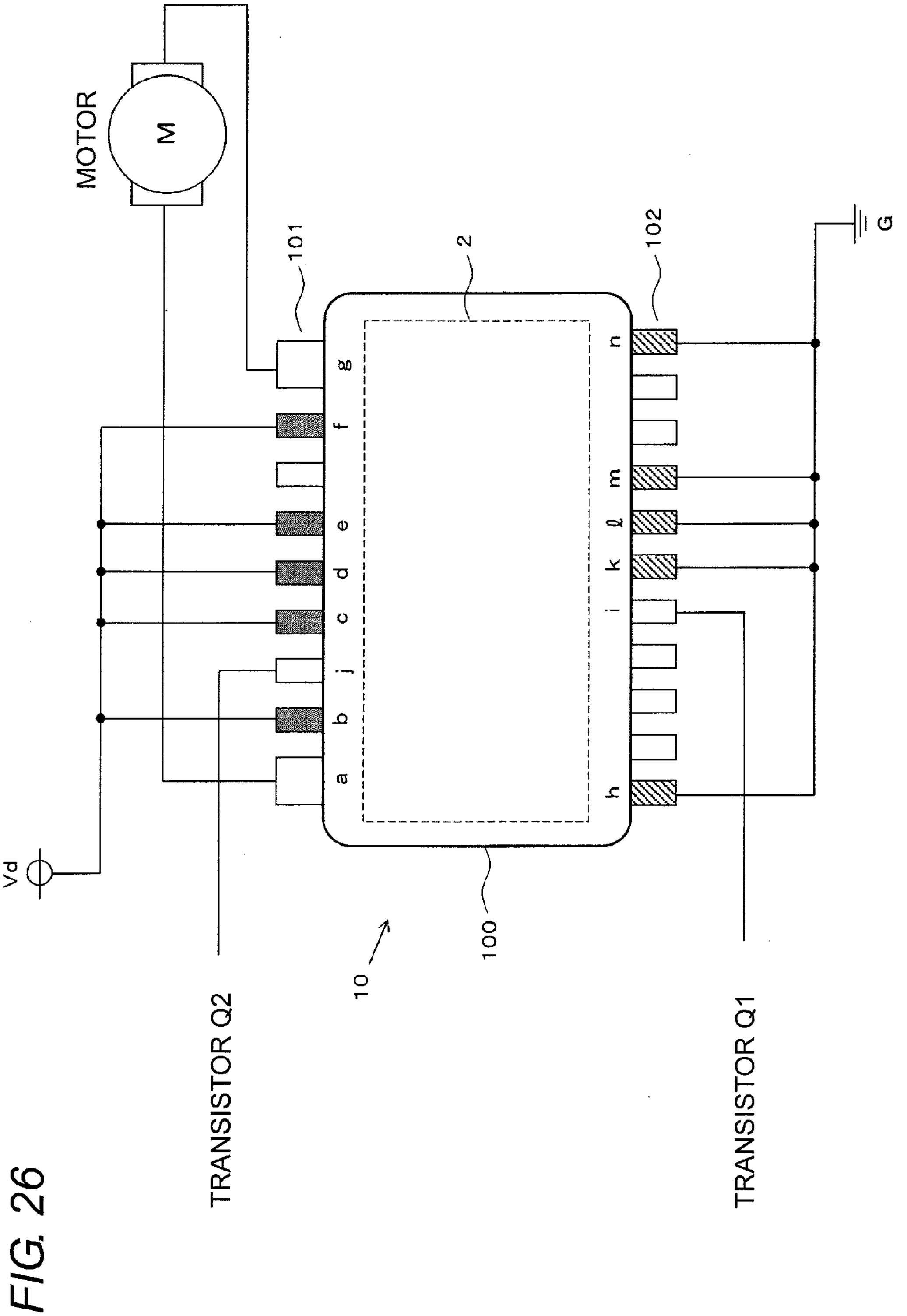
FIG. 26 is a plan view of an IC having another terminal arrangement.
Figure 27:
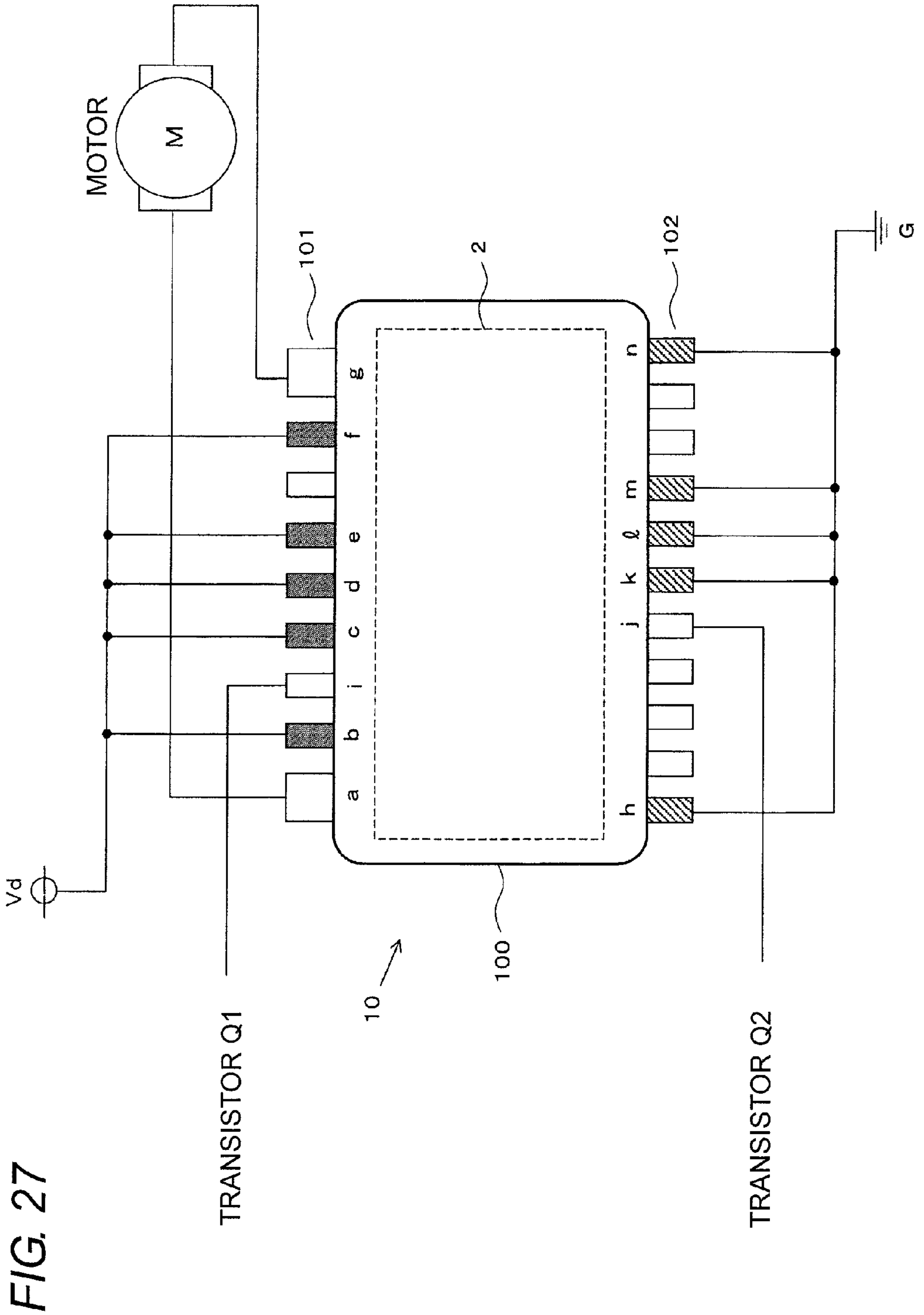
FIG. 27 is a plan view of an IC having still another terminal arrangement.
Figure 28:
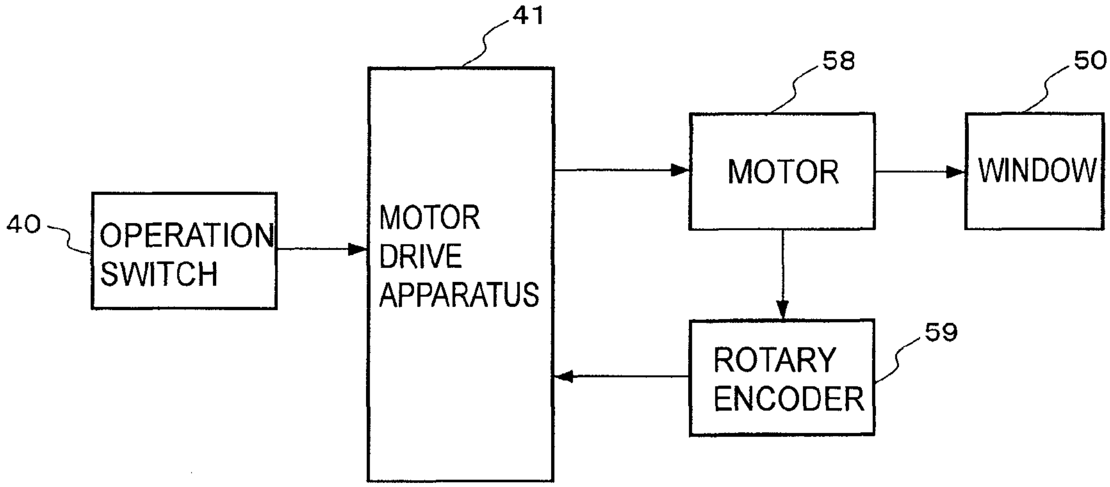
FIG. 28 is a block diagram of a power window apparatus.
Figure 29:
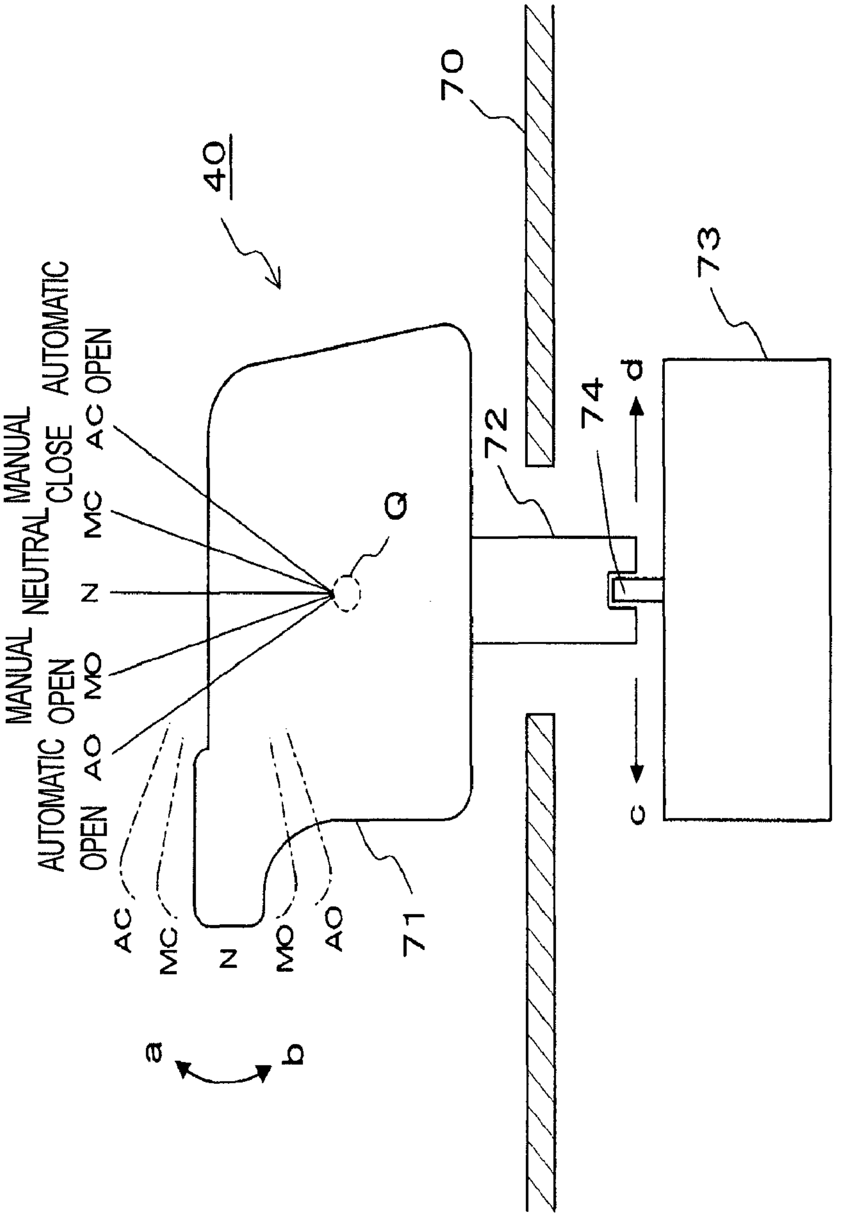
FIG. 29 is a schematic configuration view showing an example of an operation switch.
Figure 30:
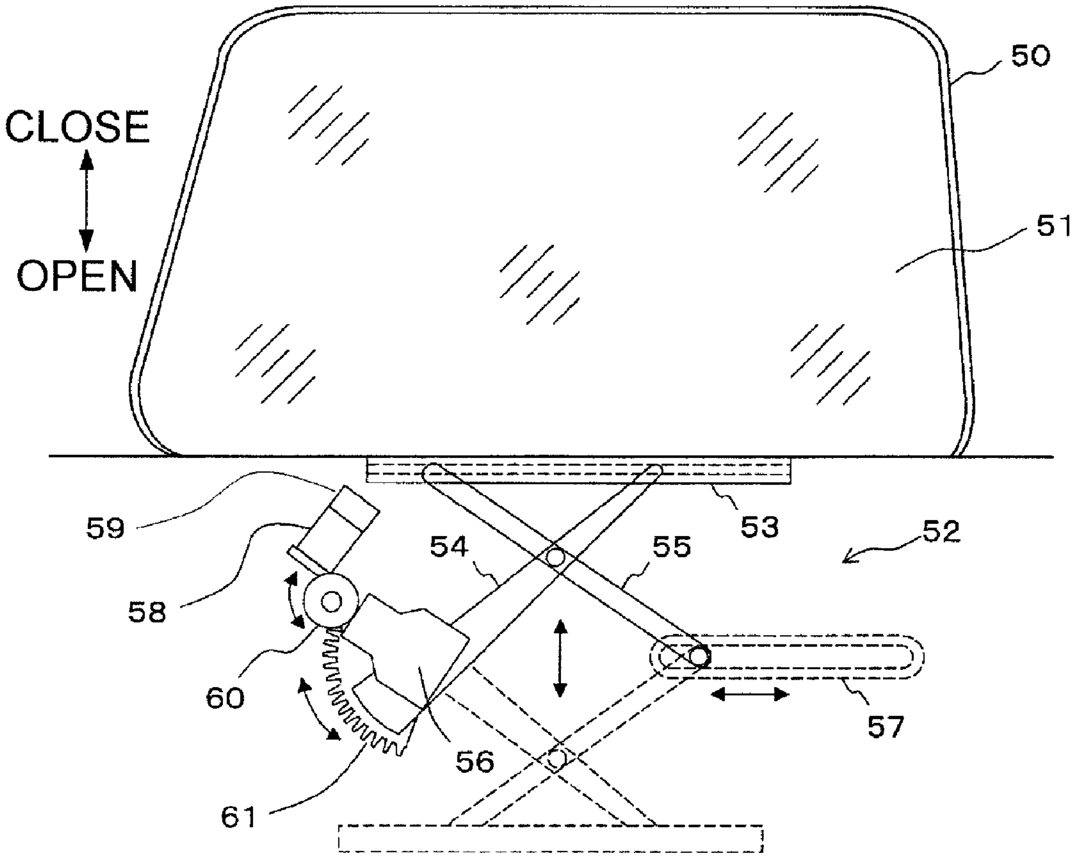
FIG. 30 is a view showing an example of a window open/close mechanism arranged at each window of a vehicle.

In the present embodiment, various kinds of embodiments can be employed other than the above-described embodiments. For example, in the first embodiment and the third embodiment, the wetting detection circuit 3 is configured such that both of the terminal i and the terminal j attain "L" level when the wetting detection circuit 3 detects wetting. Alternatively, the wetting detection circuit 3 may be configured such that the terminal i attains "L" level and the terminal j attains "H" level when the wetting detection circuit 3 detects wetting. In this case, as shown in FIG. 26, the terminal i, which attains "L" level, is separated from the high level terminals b, c, d, e, f and is arranged in proximity to the low level terminals h, k, l, m, n. The terminal j, which attains "H" level, is separated from the low level terminals h, k, l, m, n, and is arranged in proximity to the high level terminals b, c, d, e, f. On the contrary, the circuit may be configured such that the terminal i attains "H" level and the terminal j attains "L" level. In this case, as shown in FIG. 27, the terminal j, which attains "L" level, is separated from the high level terminals b, c, d, e, f and is arranged in proximity to the low level terminals h, k, l, m, n. The terminal i, which attains "H" level, is separated from the low level terminals h, k, l, m, n, and is arranged in proximity to the high level terminals b, c, d, e, f. In each of these cases, the logic in the table Y is also changed.

Likewise, in the second embodiment and the fourth embodiment, the wetting detection circuit 3 is configured such that both of the terminal i and the terminal j attain "H" level when the wetting detection circuit 3 detects wetting. Alternatively, the wetting detection circuit 3 may be configured such that the terminal i attains "H" level and the terminal j attains "L" level when the wetting detection circuit 3 detects wetting. In this case, as shown in FIG. 27, the terminal j, which attains "L" level, is arranged in proximity to the low level terminals h, k, l, m, n. The terminal i, which attains "H" level, is arranged in proximity to the high level terminals b, c, d, e, f. On the contrary, the circuit may be configured such that the terminal i attains "L" level and the terminal j attains "H" level. In this case, as shown in FIG. 26, the terminal i, which attains "L" level, is arranged in proximity to the low level terminals h, k, l, m, n, and the terminal j, which attains "H" level, is arranged in proximity to the high level terminals b, c, d, e, f. In each of these cases, the logic in the table Y is also changed.

As described above, the terminal, which attain low voltage during wetting, is arranged in proximity to the low level terminals h, k, l, m, n, so that the voltage difference between the terminal and the low level terminals h, k, l m, n becomes small. Further, the terminal, which attain high voltage during wetting, is arranged in proximity to the high level terminals b, c, d, e, f, so that the voltage difference between the terminal and the high level terminals b, c, d, e, f becomes small. Therefore, the IC 10 and the IC 20 are less likely to malfunction due to the short-circuit between the terminals during wetting.

In the above embodiments, the window opens in response to the normal rotation instruction S1 provided by the operation switch 4, and the window closes in response to the reverse rotation instruction S2. On the contrary, the window may open in response to the reverse rotation instruction S2 provided by the operation switch 4, and the window may close in response to the normal rotation instruction S1.

In the above embodiments, the high level terminals b, c, d, e, f and the low level terminals h, k, l, m, n are connected to the power supply and the ground, respectively. In addition, they may include other terminals for receiving and outputting other signals.

In the above embodiments, the five high level terminals and the five low level terminals are arranged. However, the numbers of terminals are not limited thereto. Any number of terminals may be arranged according to the design of the IC.

Further, in the above embodiments, a case where the present invention is applied to the power window apparatus has been described as an example. However, the present invention is not limited to open/close control of windows. For example, the present invention may be applied to a motor drive apparatus used for open/close control of a sunroof and positioning control of seats.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor drive apparatus for driving a motor in a normal rotation direction or a reverse rotation direction in accordance with a state of operation of an operation switch, the motor drive apparatus comprising:

a first semiconductor switching device that switches ON/OFF state based on a normal rotation instruction provided by the operation switch;

a second semiconductor switching device that switches ON/OFF state based on a reverse rotation instruction provided by the operation switch;

a control circuit for controlling drive of the motor in the normal rotation direction or the reverse rotation direction, based on the ON/OFF state of the first and second semiconductor switching devices; and a wetting detection circuit for detecting wetting and controlling operation of the first and second semiconductor switching devices, wherein the control circuit includes:

a first terminal connected to the first semiconductor switching device;

a second terminal connected to the second semiconductor switching device;

a low level terminal for receiving or outputting a signal having a voltage value lower than a reference voltage value defined in advance; and a high level terminal for receiving or outputting a signal having a voltage value higher than the reference voltage value, wherein the wetting detection circuit comprises a third semiconductor device that turns ON when wetting is detected, wherein, when the wetting detection circuit detects wetting and when the normal rotation instruction and the reverse rotation instruction are not provided by the operation switch, current flows from a power supply to both of the first semiconductor switching device and the second semiconductor switching device via the third semiconductor switching device, and both of the first semiconductor switching device and the second semiconductor switching device turn ON, whereby voltage values of the first terminal and the second terminal are less than the reference voltage value, wherein, when the wetting detection circuit detects wetting and when the normal rotation instruction is provided by the operation switch, current flows from the power supply to only the second semiconductor switching device of the first and second semiconductor switching devices via the third semiconductor switching device, and only the second semiconductor switching device of the first and second semiconductor switching devices turns ON, whereby the voltage value of the first terminal is more than the reference voltage value, wherein, when the wetting detection circuit detects wetting and when the reverse rotation instruction is provided by the operation switch, current flows from the power supply to both of the first semiconductor switching device and the second semiconductor switching device via the third semiconductor switching device, and both of the first semiconductor switching device and the second semiconductor switching device turn ON, whereby the voltage values of the first terminal and the second terminal are less than the reference voltage value, and wherein the first terminal and the second terminal are separated from the high level terminal, and are arranged in proximity to the low level terminal.

2. The motor drive apparatus according to claim 1, wherein the low level terminal is connected to a ground, and wherein the high level terminal is connected to a power supply.

3. The motor drive apparatus according to claim 2, wherein a terminal connected to the motor is arranged in proximity to the high level terminal.

4. The motor drive apparatus according to claim 1, wherein the control circuit is contained in a package of an IC (Integrated Circuit), and wherein the low level terminal is arranged on one side of the package, and the high level terminal is arranged on the other side of the package.

5. A motor drive apparatus for driving a motor in a normal rotation direction or a reverse rotation direction in accordance with a state of operation of an operation switch, the motor drive apparatus comprising:

a first semiconductor switching device that switches ON/OFF state based on a normal rotation instruction provided by the operation switch;

a second semiconductor switching device that switches ON/OFF state based on a reverse rotation instruction provided by the operation switch;

a control circuit for controlling drive of the motor in the normal rotation direction or the reverse rotation direction, based on the ON/OFF state of the first and second semiconductor switching devices; and a wetting detection circuit for detecting wetting and controlling operation of the first and second semiconductor switching devices, wherein the control circuit includes:

a first terminal connected to the first semiconductor switching device;

a second terminal connected to the second semiconductor switching device;

a low level terminal for receiving or outputting a signal having a voltage value lower than a reference voltage value defined in advance; and a high level terminal for receiving or outputting a signal having a voltage value higher than the reference voltage value, wherein the wetting detection circuit comprises a third semiconductor device that turns ON when wetting is detected, wherein when the wetting detection circuit detects wetting and when the normal rotation instruction and the reverse rotation instruction are not provided by the operation switch, current flows from both of the first semiconductor switching device and the second semiconductor switching device, and both of the first semiconductor switching device and the second semiconductor switching device turn ON, whereby voltage values of the first terminal and the second terminal are more than the reference voltage value, wherein, when the wetting detection circuit detects wetting and when the normal rotation instruction is provided by the operation switch, current flows from only the first semiconductor switching device of the first and second semiconductor switching devices to the ground via the third semiconductor switching device, and only the first semiconductor switching device of the first and second semiconductor switching devices turns ON, whereby the voltage value of the first terminal is more than the reference voltage value, and the voltage value of the second terminal is less than the reference voltage value, wherein, when the wetting detection circuit detects wetting and when the reverse rotation instruction is provided by the operation switch, current flows from both of the first semiconductor switching device and the second semiconductor switching device to the ground via the third semiconductor switching device, and both of the first semiconductor switching device and the second semiconductor switching device turn ON, whereby the voltage values of the first terminal and the second terminal are more than the reference voltage value, and wherein the first terminal and the second terminal are separated from the low level terminal, and are arranged in proximity to the high level terminal.

6. The motor drive apparatus according to claim 5, wherein the low level terminal is connected to a ground, and wherein the high level terminal is connected to a power supply.

7. The motor drive apparatus according to claim 6, wherein a terminal connected to the motor is arranged in proximity to the high level terminal.

8. A motor drive apparatus for driving a motor in a normal rotation direction or a reverse rotation direction in accordance with a state of operation of an operation switch, the motor drive apparatus comprising:

a first semiconductor switching device that switches ON/OFF state based on a normal rotation instruction provided by the operation switch;

a second semiconductor switching device that switches ON/OFF state based on a reverse rotation instruction provided by the operation switch;

a control circuit for controlling drive of the motor in the normal rotation direction or the reverse rotation direction, based on the ON/OFF state of the first and second semiconductor switching devices; and a wetting detection circuit for detecting wetting and controlling operation of the first and second semiconductor switching devices, wherein the control circuit includes:

a first terminal connected to the first semiconductor switching device;

a second terminal connected to the second semiconductor switching device;

a low level terminal for receiving or outputting a signal having a voltage value lower than a reference voltage value defined in advance; and a high level terminal for receiving or outputting a signal having a voltage value higher than the reference voltage value, wherein the wetting detection circuit comprises a third semiconductor device that turns ON when wetting is detected, wherein, when the wetting detection circuit detects wetting and when the normal rotation instruction and the reverse rotation instruction are not provided by the operation switch, current flows from a power supply to both of the first semiconductor switching device and the second semiconductor switching device via the third semiconductor switching device, and both of the first semiconductor switching device and the second semiconductor switching device turn ON, whereby voltage values of the first terminal and the second terminal are less than the reference voltage value, wherein, when the wetting detection circuit detects wetting and when the normal rotation instruction is provided by the operation switch, current flows from the power supply to only the first semiconductor switching device of the first and second semiconductor switching devices via the third semiconductor switching device, and only the first semiconductor switching device of the first and second semiconductor switching devices turns ON, whereby voltage value of the first terminal is less than the reference voltage value, and the voltage value of the second terminal is more than the reference voltage value, wherein, when the wetting detection circuit detects wetting and when the reverse rotation instruction is provided by the operation switch, the current flows from the power supply to both of the first semiconductor switching device and the second semiconductor switching device via the third semiconductor switching device, and both of the first semiconductor switching device and the second semiconductor switching device turn ON, whereby the voltage values of the first terminal and the second terminal are less than the reference voltage value, wherein the first terminal is separated from the high level terminal, and is arranged in proximity to the low level terminal, and wherein the second terminal is separated from the low level terminal, and is arranged in proximity to the high level terminal.

9. The motor drive apparatus according to claim 8, wherein the low level terminal is connected to a ground, and wherein the high level terminal is connected to a power supply.

10. The motor drive apparatus according to claim 9, wherein a terminal connected to the motor is arranged in proximity to the high level terminal.

11. A motor drive apparatus for driving a motor in a normal rotation direction or a reverse rotation direction in accordance with a state of operation of an operation switch, the motor drive apparatus comprising:

a first semiconductor switching device that switches ON/OFF state based on a normal rotation instruction provided by the operation switch;

a second semiconductor switching device that switches ON/OFF state based on a reverse rotation instruction provided by the operation switch;

a control circuit for controlling drive of the motor in the normal rotation direction or the reverse rotation direction, based on the ON/OFF state of the first and second semiconductor switching devices; and a wetting detection circuit for detecting wetting and controlling operation of the first and second semiconductor switching devices, wherein the control circuit includes:

a first terminal connected to the first semiconductor switching device;

a second terminal connected to the second semiconductor switching device;

a low level terminal for receiving or outputting a signal having a voltage value lower than a reference voltage value defined in advance; and a high level terminal for receiving or outputting a signal having a voltage value higher than the reference voltage value, wherein the wetting detection circuit comprises a third semiconductor device that turns ON when wetting is detected, wherein, when the wetting detection circuit detects wetting and when the normal rotation instruction and the reverse rotation instruction are not provided by the operation switch, current flows from both of the first semiconductor switching device and the second semiconductor switching device to a ground via the third semiconductor switching device, and both of the first semiconductor switching device and the second semiconductor switching device turn ON, whereby voltage values of the first terminal and the second terminal are more than the reference voltage value, wherein, when the wetting detection circuit detects wetting and when the normal rotation instruction is provided by the operation switch, current flows from only the second semiconductor switching device of the first and second semiconductor switching devices to the ground via the third semiconductor switching device, and only the second semiconductor switching device of the first and second semiconductor switching devices turns ON, whereby the voltage value of the first terminal is less than the reference voltage value, and the voltage value of the second terminal is more than the reference voltage value, wherein, when the wetting detection circuit detects wetting and when the reverse rotation instruction is provided by the operation switch, current flows from both of the first semiconductor switching device and the second semiconductor switching device to the ground via the third semiconductor switching device, and both of the first and second semiconductor switching device turn ON, whereby the voltage values of the first terminal and the second terminal are more than the reference voltage value, and wherein the first terminal is separated from the low level terminal, and is arranged in proximity to the high level terminal, and wherein the second terminal is separated from the high level terminal, and is arrange in proximity to the low level terminal.

* * * * *